United States Patent
Solano Arenas et al.

(10) Patent No.: US 11,646,855 B2
(45) Date of Patent: *May 9, 2023

(54) SHORT CONTROL CHANNEL ELEMENT (SCCE) TO SHORT RESOURCE ELEMENT GROUPS (SREG) MAPPING FOR SHORT PHYSICAL DOWNLINK CONTROL CHANNEL (SPDCCH)

(71) Applicant: Telefonaktiebolaget LM Ericsson (publ), Stockholm (SE)

(72) Inventors: John Camilo Solano Arenas, Neuss (DE); Laetitia Falconetti, Järfälla (SE); Niklas Andgart, Södra Sandby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 17/730,519

(22) Filed: Apr. 27, 2022

(65) Prior Publication Data

US 2022/0255712 A1  Aug. 11, 2022

Related U.S. Application Data

(63) Continuation of application No. 16/650,925, filed as application No. PCT/IB2018/057584 on Sep. 28, 2018, now Pat. No. 11,356,231.

(Continued)

(51) Int. Cl.
*H04L 5/00* (2006.01)
*H04L 1/04* (2006.01)
(Continued)

(52) U.S. Cl.
CPC .............. *H04L 5/0094* (2013.01); *H04L 1/04* (2013.01); *H04L 5/0051* (2013.01);
(Continued)

(58) Field of Classification Search
CPC ......... H04W 72/1263; H04W 72/1205; H04W 72/12; H04W 72/14; H04L 5/0094;
(Continued)

(56) References Cited

U.S. PATENT DOCUMENTS

| | | |
|---|---|---|
| 2016/0105875 A1 | 4/2016 | Liu et al. |
| 2017/0013618 A1 | 1/2017 | Shin |

(Continued)

FOREIGN PATENT DOCUMENTS

| | | |
|---|---|---|
| JP | 2013157822 A | 8/2013 |
| JP | 2016119678 A | 6/2016 |

(Continued)

OTHER PUBLICATIONS

Non-Final Office Action for U.S. Appl. No. 16/650,925, dated May 27, 2021, 11 pages.

(Continued)

*Primary Examiner* — Phong La
(74) *Attorney, Agent, or Firm* — Withrow & Terranova, PLLC

(57) ABSTRACT

Short Control Channel Elements (SCCE) to Short Resource Element Groups (SREG) mapping for Short Physical Downlink Control Channel (SPDCCH) is provided. A User Equipment (UE) receives a communication from a base station; determines a mapping between one or more SCCE and corresponding SREG; and processes the communication based on the mapping. A base station determines a mapping between one or more SCCE and corresponding SREG for a communication to a UE and transmits a communication to the UE based on the mapping. In this way, the localized and distributed SCCE to SREG mapping for CRS-based SPDCCH is defined. Also, the SCCE to SREG mapping for 2 and 3 OFDM symbols DMRS-based SPDCCH is defined. For DMRS-based SPDCCH, a distributed configuration at (Continued)

SCCE level is defined. This may improve latency and can improve the average throughput of a communications system. Radio resource efficiency could be positively impacted by latency reductions.

20 Claims, 18 Drawing Sheets

Related U.S. Application Data

(60) Provisional application No. 62/565,942, filed on Sep. 29, 2017.

(51) Int. Cl.
  *H04L 5/10*   (2006.01)
  *H04W 72/12*   (2009.01)
  *H04W 72/1263*   (2023.01)

(52) U.S. Cl.
  CPC .............. *H04L 5/0082* (2013.01); *H04L 5/10* (2013.01); *H04W 72/1263* (2013.01)

(58) Field of Classification Search
  CPC ....... H04L 5/0051; H04L 5/0082; H04L 1/04; H04L 1/02; H04L 1/06
  See application file for complete search history.

(56) References Cited

U.S. PATENT DOCUMENTS

| | | | |
|---|---|---|---|
| 2017/0142712 A1 | 5/2017 | Lee et al. | |
| 2017/0230154 A1 | 8/2017 | Tavildar et al. | |
| 2017/0230994 A1 | 8/2017 | You et al. | |
| 2017/0290004 A1 | 10/2017 | Yang et al. | |
| 2018/0049166 A1 | 2/2018 | Sun et al. | |
| 2018/0049175 A1 | 2/2018 | Bagheri et al. | |
| 2018/0049189 A1 | 2/2018 | Hugl et al. | |
| 2018/0124744 A1 | 5/2018 | Xue et al. | |
| 2018/0132272 A1 | 5/2018 | Sun et al. | |
| 2018/0206266 A1* | 7/2018 | Byun .................... | H04W 72/14 |
| 2018/0227889 A1 | 8/2018 | Yang | |
| 2018/0242289 A1 | 8/2018 | Andgart et al. | |
| 2018/0279305 A1 | 9/2018 | Bagheri et al. | |
| 2018/0309489 A1 | 10/2018 | Hosseini et al. | |
| 2018/0324769 A1* | 11/2018 | Hosseini ........... | H04W 72/0446 |
| 2018/0359733 A1* | 12/2018 | Bagheri ............ | H04W 72/0446 |
| 2019/0052332 A1 | 2/2019 | Shimezawa | |
| 2019/0098622 A1 | 3/2019 | Lee et al. | |
| 2019/0190582 A1 | 6/2019 | Guo et al. | |
| 2019/0223228 A1 | 7/2019 | Ko et al. | |
| 2019/0229879 A1 | 7/2019 | Yi et al. | |
| 2019/0306737 A1 | 10/2019 | Kwak et al. | |
| 2019/0349885 A1 | 11/2019 | Koskela et al. | |
| 2020/0053670 A1 | 2/2020 | Jung et al. | |
| 2020/0059902 A1 | 2/2020 | Falconetti et al. | |
| 2020/0092685 A1 | 3/2020 | Fehrenbach et al. | |
| 2020/0127783 A1 | 4/2020 | Kwak et al. | |
| 2020/0196356 A1 | 6/2020 | Ko et al. | |
| 2020/0244530 A1 | 7/2020 | Lin et al. | |
| 2020/0267764 A1 | 8/2020 | Rastegardoost et al. | |
| 2020/0274681 A1 | 8/2020 | Solano Arenas et al. | |
| 2020/0296698 A1 | 9/2020 | Kwak et al. | |
| 2020/0305129 A1 | 9/2020 | Lee et al. | |
| 2020/0389255 A1 | 12/2020 | Harrison et al. | |
| 2021/0120537 A1 | 4/2021 | Lei et al. | |
| 2021/0314129 A1 | 10/2021 | You et al. | |

FOREIGN PATENT DOCUMENTS

| | | | |
|---|---|---|---|
| WO | 2017018618 | A1 | 2/2017 |
| WO | 2017076459 | A1 | 5/2017 |
| WO | 2017122959 | A1 | 7/2017 |
| WO | 2017167506 | A1 | 10/2017 |
| WO | 2018083260 | A1 | 5/2018 |
| WO | 2018141597 | A1 | 8/2018 |
| WO | 2018141931 | A1 | 8/2018 |
| WO | 2018202893 | A1 | 11/2018 |
| WO | 2019030346 | A1 | 2/2019 |

OTHER PUBLICATIONS

Notice of Allowance for U.S. Appl. No. 16/650,925, dated Sep. 28, 2021, 8 pages.
Notice of Allowance for U.S. Appl. No. 16/650,925, dated Feb. 16, 2022, 7 pages.
Corrected Notice of Allowability for U.S. Appl. No. 16/650,925, dated Apr. 7, 2022, 4 pages.
Non-Final Office Action for U.S. Appl. No. 16/300,445, dated Jun. 9, 2021, 8 pages.
Notice of Allowance for U.S. Appl. No. 16/300,445, dated Apr. 26, 2022, 9 pages.
Author Unknown, "Technical Specification Group Radio Access Network; Evolved Universal Terrestrial Radio Access (E-UTRA); Study on latency reduction techniques for LTE (Release 14)," Technical Report 36.881, Version 1.0.0, 3GPP Organizational Partners, May 2016, 98 pages.
Author Unknown, "Technical Specification Group Radio Access Network; Evolved Universal Terrestrial Radio Access (E-UTRA); Physical channels and modulation (Release 14)," Technical Specification 36.211, Version 14.3.0, 3GPP Organizational Partners, Jun. 2017, 195 pages.
Author Unknown, "Technical Specification Group Radio Access Network; Evolved Universal Terrestrial Radio Access (E-UTRA); Physical channels and modulation (Release 15)," Technical Specification 36.211, Version 15.2.0, 3GPP Organizational Partners, Jun. 2018, 236 pages.
Author Unknown, "Technical Specification Group Radio Access Network; Evolved Universal Terrestrial Radio Access (E-UTRA); Multiplexing and channel coding (Release 13)," Technical Specification 36.212, Version 13.1.0, 3GPP Organizational Partners, Mar. 2016, 129 pages.
Author Unknown, "Technical Specification Group Radio Access Network; Evolved Universal Terrestrial Radio Access (E-UTRA); Physical layer procedures (Release 13)," Technical Specification 36.213, Version 13.1.1, 3GPP Organizational Partners, Mar. 2016, 361 pages.
Author Unknown, "Technical Specification Group Radio Access Network; Evolved Universal Terrestrial Radio Access (E-UTRA); Physical layer procedures (Release 14)," Technical Specification 36.213, Version 14.3.0, 3GPP Organizational Partners, Jun. 2017, 460 pages.
Author Unknown, "HTTP Archive—Trends," Query Start Aug. 1, 2016 End Jul. 15, 2017, URL: http://httparchive.org/trends.php, retrieved Aug. 9, 2017, 6 pages.
CATT, "R1-1611353: Other issues for sPDCCH design," Third Generation Partnership Project (3GPP), TSG RAN WG1 Meeting #87, Nov. 14-18, 2016, 3 pages, Reno, USA.
CATT, "R1-1707433: Design on sPDCCH multiplexing with data," 3GPP TSG RAN WG1 Meeting #89, May 15-19, 2017, Hangzhou, China, 2 pages.
Ericsson, "R1-1611511: On sTTI scheduling options," Third Generation Partnership Project (3GPP), TSG-RAN WG1 #87, Nov. 14-18, 2016, 4 pages, Reno, USA.
Ericsson, "R1-163312: System level evaluation of short TTI," Third Generation Partnership Project (3GPP), TSG RAN WG1 Meeting #84 bis, Apr. 11-15, 2016, 12 pages, Busan.
Ericsson, "R1-1703260: Design aspects of sPDCCH," Third Generation Partnership Project (3GPP), TSG-RAN WG1 Meeting #88, Feb. 13-17, 2017, 8 pages, Athens, Greece.
Ericsson, "R1-1703261: Multiplexing sPDCCH with sPDSCH/PDSCH," Third Generation Partnership Project (3GPP), TSG-RAN WG1 Meeting #88, Feb. 13-17, 2017, 6 pages, Athens, Greece.
Ericsson, "R1-1703265: Design aspects of sPDSCH," Third Generation Partnership Project (3GPP), TSG-RAN WG1 Meeting #88, Feb. 13-17, 2017, 4 pages, Athens, Greece.

(56) References Cited

OTHER PUBLICATIONS

Ericsson, "R1-1706075: Design Aspects of sPDCCH," 3GPP TSG-RAN WG1 Meeting #88bis, Apr. 3-7, 2017, Spokane, Washington, 8 pages.
Ericsson, "R1-1706076: Multiplexing sPDCCH with sPDSCH/PDSCH," Third Generation Partnership Project (3GPP), TSG-RAN WG1 Meeting #88bis, Apr. 3-7, 2017, 6 pages, Spokane, US.
Ericsson, "R1-1708863: Search space for sTTI," Third Generation Partnership Project (3GPP), TSG-RAN WG1 Meeting #89, May 15-19, 2017, 4 pages, Hangzhou, P.R. China.
Ericsson, "R1-1708864: Multiplexing sPDCCH with sPDSCH/PDSCH," 3GPP TSG-RAN WG1 Meeting #89, May 15-19, 2017, Hangzhou, China, 6 pages.
Ericsson, "R1-1712895: Design aspects of sPDCCH," Third Generation Partnership Project (3GPP) TSG-RAN WG1 Meeting #90, Aug. 21-25, 2017, 12 pages, Prague, Czech Republic.
Ericsson, "R1-1712896: Search space for sTTI," 3GPP TSG-RAN WG1 Meeting #90, Aug. 21-25, 2017, Prague, Czech Republic, 8 pages.
Ericsson, "RP-161299: New Work Item on shortened TTI and processing time for LTE," Third Generation Partnership Project (3GPP), TSG RAN Meeting #72, Jun. 13-16, 2016, 9 pages, Busan, Korea.
Ericsson, "RP-170xxx: Revised Work Item on shortened TTI and processing time for LTE," Third Generation Partnership Project (3GPP) TSG RAN Meeting #75, Mar. 6-9, 2017, 5 pages, Dubrovnik, Croatia.
Huawei, et al., "R1-166148: sPDCCH design for short TTI," Third Generation Partnership Project (3GPP), TSG RAN WG1 Meeting #86, Aug. 22-26, 2016, 7 pages, Gothenburg, Sweden.
Huawei, et al., "R1-1704264: Discussion on sPDCCH design," Third Generation Partnership Project (3GPP), TSG RAN WG1 Meeting #88b, Apr. 3-7, 2017, 16 pages, Spokane, USA~.
Huawei, et al., "R1-1706989: sPDCCH design," 3GPP TSG RAN WG1 Meeting #89, May 15-19, 2017, Hangzhou, China, 12 pages.
Huawei, et al., "R1-1712076: sPDCCH design," 3GPP TSG RAN WG1 Meeting #90, Aug. 21-25, 2017, Prague, Czech Republic, 13 pages.
Huawei, et al., "R1-1712089: Search space for sTTI," 3GPP TSG RAN WG1 Meeting #90, Aug. 21-25, 2017, Prague, Czech Republic, 8 pages.
Intel Corporation, "R1-1707293: Search space for shortened DL control channels," 3GPP TSG-RAN WG1 #89, May 15-19, 2017, Hangzhou, China, 5 pages.
LG Electronics, et al., "R1-1704019: WF on sCCE-to-sREG mapping for sPDCCH," Third Generation Partnership Project (3GPP), TSG RAN1 #88, Feb. 13-17, 2017, 2 pages, Athens, Greece.
Motorola Mobility, et al., "R1-1714208: sPDCCH design," Third Generation Partnership Project (3GPP), TSG RAN WG1 #90, Aug. 21-25, 2017, 2 pages, Prague, Czechia.
Nokia, et al., "R1-1612211: On design of search space for short Pdcch," 3GPP TSG-RAN WGL Meeting #87, Nov. 14-18, 2016, Reno, Neva, 6 pages.
Nokia, et al., "R1-167081: On DL control channel design for shorter TTI operation," Third Generation Partnership Project (3GPP), TSG-RAN WG1 Meeting #86, Aug. 22-26, 2016, 4 pages, Gothenburg, Sweden.
Nokia, et al., "R1-1704806: On DL control channel design for shorter TTI operation," 3GPP TSG-RAN WG1 Meeting #86bis, Apr. 3-7, 2017, Spokane, Washington, 9 pages.
Nokia, et al., "R1-1712951: On DL control channel design for shorter TTI Operation," 3GPP TSG-RAN WG1 Meeting #90, Aug. 21-25, 2017, Prague, Czech Republic, 8 pages.
NTT Docomo, Inc., "R1-1705687: Views on sPDCCH design," Third Generation Partnership Project (3GPP), TSG RAN WG1 Meeting #88bis, Apr. 3-7, 2017, 6 pages, Spokane, USA.
Qualcomm Incorporated, "R1-1611638: Downlink Control Channel Design for Shortened TTI," Third Generation Partnership Project (3GPP), TSG RAN WG1 #87, Nov. 14-18, 2016, 9 pages, Reno, Nevada, USA.
ZTE, et al., "R1-1611469: Discussion on sPDCCH for sTTI," Third Generation Partnership Project (3GPP), TSG RAN WG1 Meeting #87, Nov. 14-18, 2016, 7 pages, Reno, USA.
ZTE, "R1-1712323: sPDCCH design for short TTI," 3GPP TSG RAN WG1 Meeting #90, Aug. 21-25, 2017, Prague, Czech Republic, 8 pages.
First Office Action for Chinese Patent Application No. 20188006333.5, dated Jan. 21, 2022, 19 pages.
Examination Report for European Patent Application No. 18792499.8, dated Jul. 2, 2021, 23 pages.
Examination Report for European Patent Application No. 18753399.7, dated Oct. 22, 2021, 6 pages.
Examination Report for European Patent Application No. 18753399.7, dated Nov. 10, 2021, 7 pages.
Notice of Reasons for Rejection for Japanese Patent Application No. 2020-517378, dated Aug. 3, 2021, 57 pages.
Decision to Grant for Japanese Patent Application No. 2020-517378, dated Mar. 22, 2022, 5 pages.
Invitation to Pay Additional Fees and Partial Search for International Patent Application No. PCT/IB2018/057584, dated Jan. 21, 2019, 23 pages.
International Search Report and Written Opinion for International Patent Application No. PCT/IB2018/057584, dated Mar. 19, 2019, 25 pages.
International Search Report and Written Opinion for International Patent Application No. PCT/EP2018/051648, dated Apr. 10, 2018, 10 pages.
International Search Report and Written Opinion for International Patent Application No. PCT/EP2018/071683, dated Jan. 21, 2019, 17 pages.
International Preliminary Report on Patentability for International Patent Application No. POT/EP2018/071683, dated Dec. 5, 2019, 29 pages.
Non-Final Office Action for U.S. Appl. No. 15/756,117, dated Jul. 26, 2019, 12 pages.

\* cited by examiner

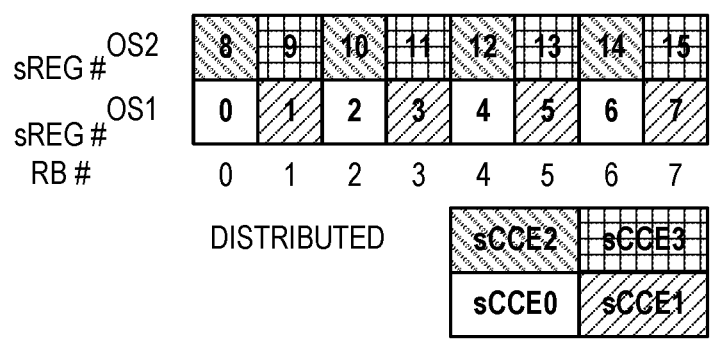
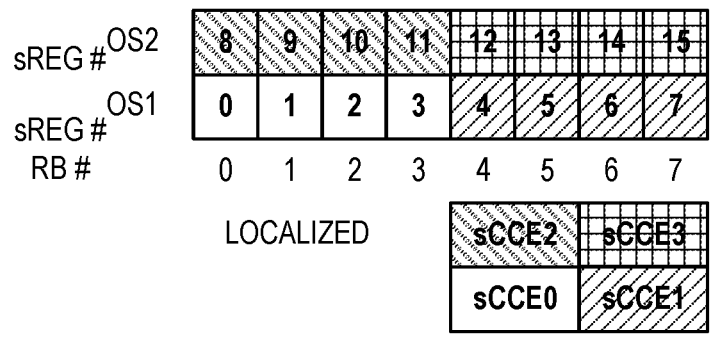
FIG. 8

2 OS DMRS-BASED sPDCCH

3 OS DMRS-BASED sPDCCH

FIG. 9

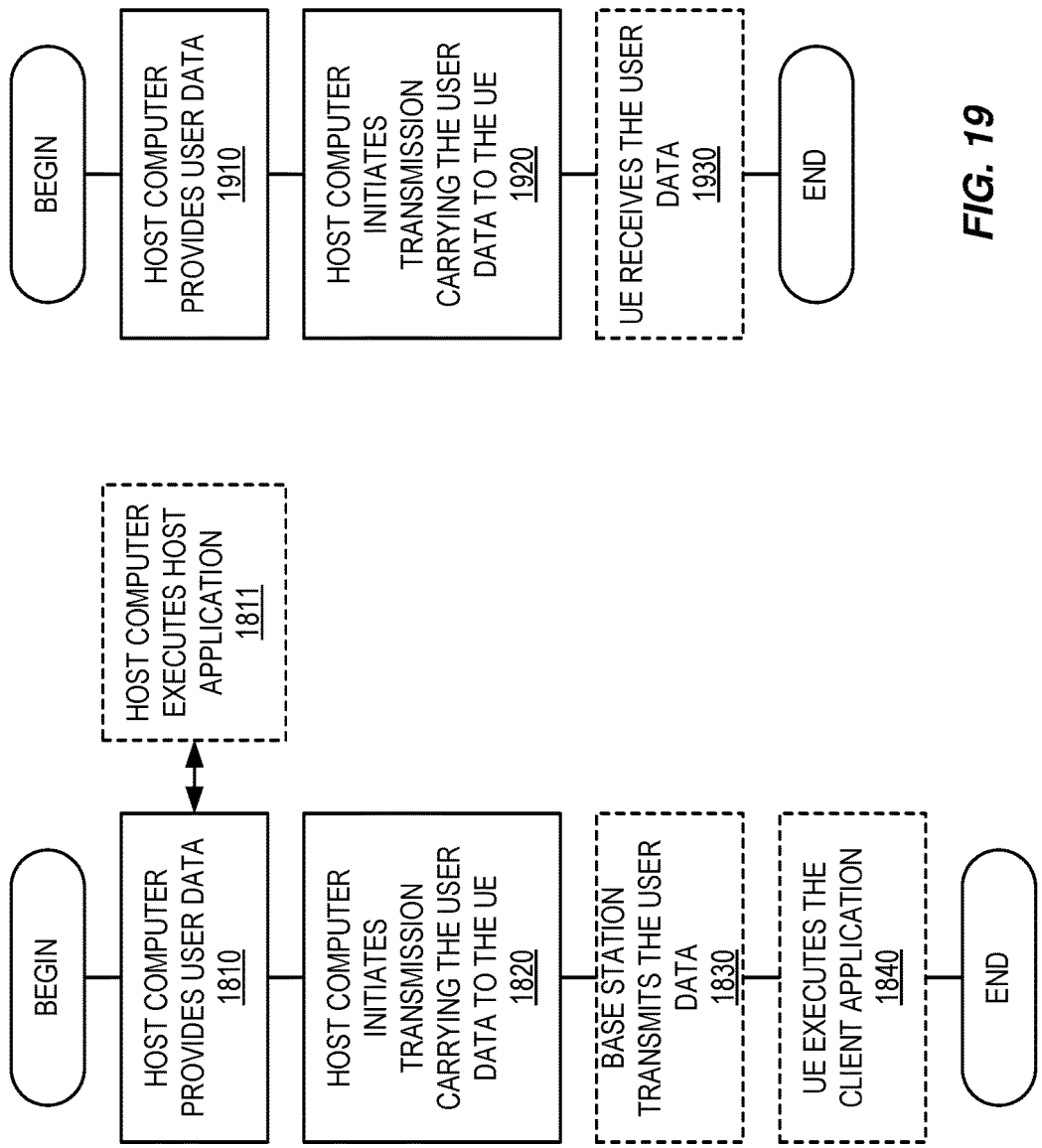

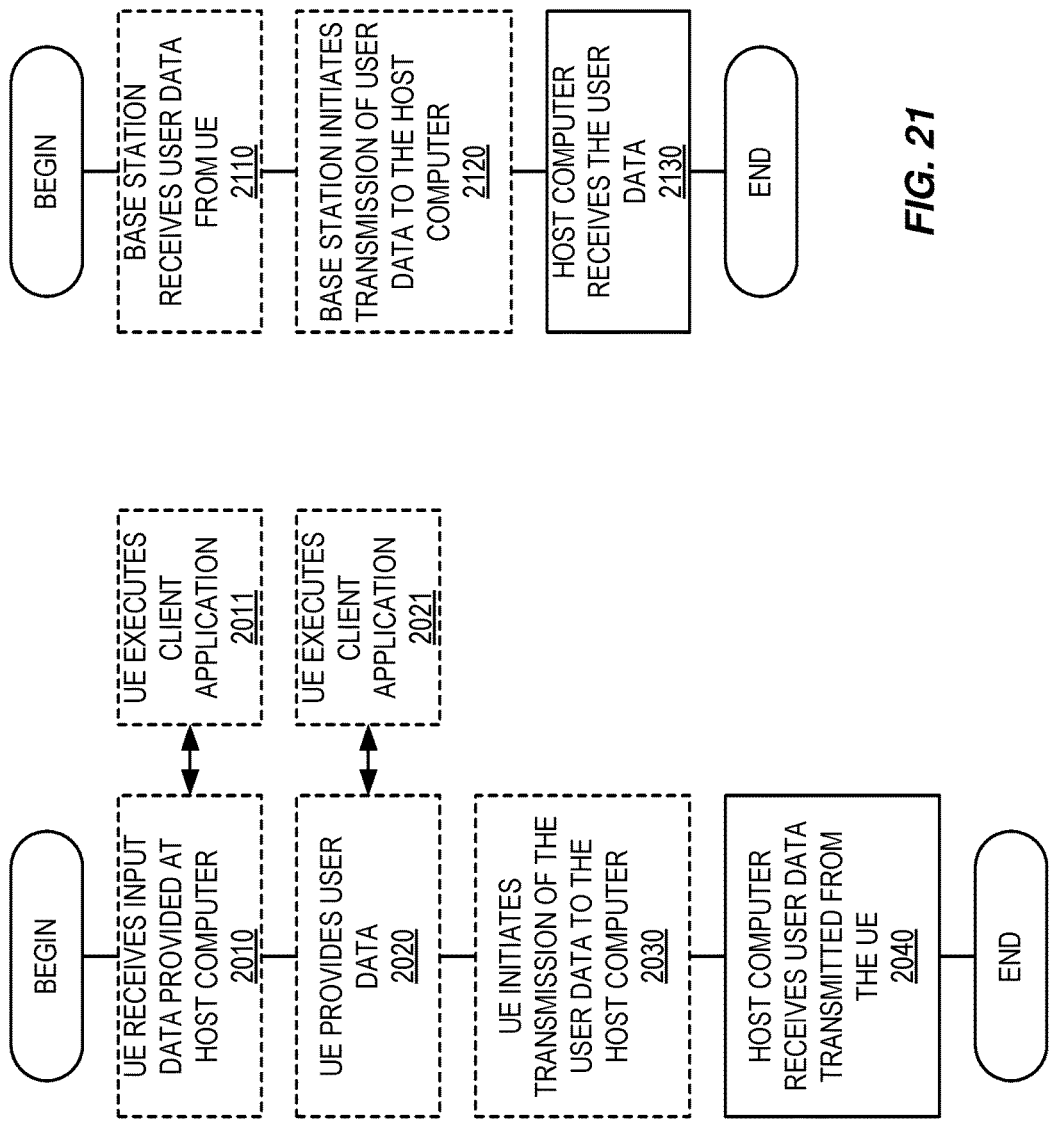

SHORT CONTROL CHANNEL ELEMENT (SCCE) TO SHORT RESOURCE ELEMENT GROUPS (SREG) MAPPING FOR SHORT PHYSICAL DOWNLINK CONTROL CHANNEL (SPDCCH)

RELATED APPLICATIONS

This application is a continuation of U.S. patent application Ser. No. 16/650,925, filed Mar. 26, 2020, which is a 35 U.S.C. § 371 national phase filing of International Application No. PCT/IB2018/057584, filed Sep. 28, 2018, which claims the benefit of provisional patent application Ser. No. 62/565,942, filed Sep. 29, 2017, the disclosures of which are hereby incorporated herein by reference in their entireties.

TECHNICAL FIELD

The disclosure relates to wireless communications, and in particular, to signaling for Short Transmission Time Interval (STTI) transmissions.

BACKGROUND

The present disclosure is described within the context of Long Term Evolution (LTE), i.e. Evolved Universal Terrestrial Radio Access Networks (E-UTRANs). It should be understood that the problems and solutions described herein are equally applicable to wireless access networks and User-Equipments (UEs) implementing other access technologies and standards (e.g. 5G NR). LTE is used as an example technology where suitable, and using LTE in the description therefore is particularly useful for understanding the problem and solutions solving the problem.

Packet data latency is one of the performance metrics that vendors, operators and also end-users (via speed test applications) regularly measures. Latency measurements are done in all phases of a radio access network system lifetime, when verifying a new software release or system component, when deploying a system and when the system is in commercial operation.

Shorter latency than previous generations of 3GPP RATs was one performance metric that guided the design of LTE. LTE is also now recognized by the end-users to be a system that provides faster access to internet and lower data latencies than previous generations of mobile radio technologies.

Packet data latency is important not only for the perceived responsiveness of the system; it is also a parameter that indirectly influences the throughput of the system. HTTP/TCP is the dominating application and transport layer protocol suite used on the internet today. According to HTTP Archive (http://httparchive.org/trends.php) the typical size of HTTP based transactions over the internet are in the range of a few 10's of Kbyte up to 1 Mbyte. In this size range, the TCP slow start period is a significant part of the total transport period of the packet stream. During TCP slow start the performance is latency limited. Hence, improved latency can rather easily be showed to improve the average throughput, for this type of TCP based data transactions.

Radio resource efficiency could be positively impacted by latency reductions. Lower packet data latency could increase the number of transmissions possible within a certain delay bound; hence higher Block Error Rate (BLER) targets could be used for the data transmissions freeing up radio resources potentially improving the capacity of the system.

One area to address when it comes to packet latency reductions is the reduction of transport time of data and control signaling, by addressing the length of a transmission time interval (TTI). In LTE release 8, a TTI corresponds to one subframe (SF) of length 1 millisecond (ms). One such 1 ms TTI is constructed by using 14 Orthogonal Frequency Division Multiplexing (OFDM) or Single Carrier Frequency Division Multiple Access (SC-FDMA) symbols in the case of normal cyclic prefix and 12 OFDM or SC-FDMA symbols in the case of extended cyclic prefix.

Currently, work in 3GPP is ongoing on standardizing "short TTI" or "STTI" operation, where scheduling and transmission can be done on a faster timescale. Therefore, the legacy LTE subframe is subdivided into several STTIs. Supported lengths for STTI of 2 and 7 OFDM symbols are currently discussed. Data transmission in DL may happen per STTI via the Short Physical Downlink Shared Channel (SPDSCH), which may include a control region Short Physical Downlink Control Channel SPDCCH. In Uplink (UL), data is transmitted per STTI via SPUSCH; control can be transmitted via SPUCCH.

Different alternatives are possible to schedule a STTI in UL or Downlink (DL) to a UE. In one alternative, individual UEs receive information about SPDCCH candidates for short TTI via Radio Resource Control (RRC) configuration, telling the UE where to look for the control channel for short TTI, i.e. SPDCCH. The Downlink Control Information (DCI) for STTI is actually included directly in SPDCCH. In another alternative, the DCI for STTI is split into two parts, a slow DCI sent in PDCCH and a fast DCI sent in SPDCCH. The slow grant can contain the frequency allocation for a DL and an UL short TTI band to be used for short TTI operation, it can also contain refinement about SPDCCH candidate locations.

Improved scheduling of STTIs in UL or DL to a UE is needed.

SUMMARY

Systems and methods for short Control Channel Elements (SCCE) to short Resource Element Groups (SREG) mapping for short Physical Downlink Control Channel (SPDCCH) are provided. In some embodiments, a method implemented in a User Equipment (UE) includes receiving a communication from a base station; determining a mapping between one or more SCCE and corresponding SREG for the communication from the base station; and processing the communication from the base station based on the mapping between one or more SCCE and corresponding SREG for the communication from the base station. In some embodiments, a method implemented in a base station includes determining a mapping between one or more SCCE and corresponding SREG for a communication to a UE and transmitting a communication to the UE based on the mapping between the one or more SCCE and the corresponding SREG. In this way, the localized and distributed SCCE to SREG mapping for 1 and 2 OFDM symbols Cell Specific Reference Signal (CRS)-based SPDCCH is defined. Also, the SCCE to SREG mapping for 2 and 3 OFDM symbols DMRS-based SPDCCH is defined. For DMRS-based SPDCCH, a distributed configuration at SCCE level is defined. This may improve latency and can improve the average throughput of a communications system. Radio resource efficiency could be positively impacted by latency reductions. Lower packet data latency could increase the number of transmissions possible within a certain delay bound; hence higher Block Error Rate (BLER) targets could be used for the data transmissions freeing up radio resources potentially improving the capacity of the system.

Embodiments disclosed herein relate to methods for the definition of the SCCE to SREG mapping in STTI operation. The methods are based on the demodulation scheme for SPDCCH, i.e. CRS-based and DMRS-based SPDCCH, as well as on the number of OFDM symbols configured for SPDCCH.

According to some embodiments, it is possible:
To define the localized and distributed SCCE to SREG mapping for 1 and 2 OFDM symbols CRS-based SPDCCH
To define the SCCE to SREG mapping for 2 and 3 OFDM symbols DMRS-based SPDCCH
For DMRS-based SPDCCH, to define a distributed configuration at SCCE level.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 8 illustrates distributed and localized configurations for 2os CRS-based SPDCCH, according to some embodiments;
FIG. 9 illustrates an SCCE to SREG mapping in 2os and 3os DMRS-based SPDCCH, according to some embodiments;
FIG. 18 illustrates methods implemented in a communication system including a host computer, a base station, and a user equipment in accordance with some embodiments;
FIG. 19 illustrates methods implemented in a communication system including a host computer, a base station, and a user equipment in accordance with some embodiments;
FIG. 20 illustrates methods implemented in a communication system including a host computer, a base station, and a user equipment in accordance with some embodiments;
FIG. 21 illustrates methods implemented in a communication system including a host computer, a base station and a user equipment in accordance with some embodiments.

DETAILED DESCRIPTION

Figure 1:
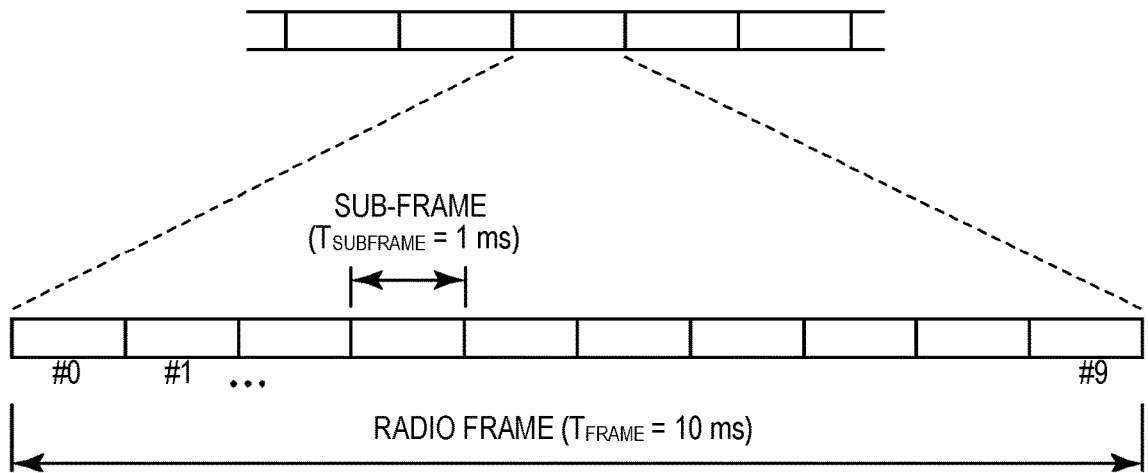
FIG. 1 illustrates the LTE time-domain structure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Latency Reduction with Short TTI Operation

Packet data latency is one of the performance metrics that vendors, operators and also end-users (via speed test applications) regularly measures. Latency measurements are done in all phases of a radio access network system lifetime, when verifying a new software release or system component, when deploying a system and when the system is in commercial operation.

Shorter latency than previous generations of 3GPP RATs was one performance metric that guided the design of Long Term Evolution (LTE). LTE is also now recognized by the end-users to be a system that provides faster access to internet and lower data latencies than previous generations of mobile radio technologies.

Packet data latency is important not only for the perceived responsiveness of the system; it is also a parameter that indirectly influences the throughput of the system. HTTP/TCP is the dominating application and transport layer protocol suite used on the internet today. According to HTTP Archive (http://httparchive.org/trends.php) the typical size of HTTP based transactions over the internet are in the range of a few 10's of Kbyte up to 1 Mbyte. In this size range, the TCP slow start period is a significant part of the total transport period of the packet stream. During TCP slow start the performance is latency limited. Hence, improved latency can rather easily be showed to improve the average throughput, for this type of TCP based data transactions.

Radio resource efficiency could be positively impacted by latency reductions. Lower packet data latency could increase the number of transmissions possible within a certain delay bound; hence higher Block Error Rate (BLER) targets could be used for the data transmissions freeing up radio resources potentially improving the capacity of the system.

One area to address when it comes to packet latency reductions is the reduction of transport time of data and control signaling, by addressing the length of a transmission time interval (TTI). In LTE release 8, a TTI corresponds to one subframe (SF) of length 1 millisecond. One such 1 ms TTI is constructed by using 14 Orthogonal Frequency Division Multiplexing (OFDM) or Single Carrier Frequency Division Multiple Access (SC-FDMA) symbols in the case of normal cyclic prefix and 12 OFDM or SC-FDMA symbols in the case of extended cyclic prefix.

Currently, work in 3GPP is ongoing on standardizing "short TTI" or "STTI" operation, where scheduling and transmission can be done on a faster timescale. Therefore, the legacy LTE subframe is subdivided into several STTI. Supported lengths for STTI of 2 and 7 OFDM symbols are currently discussed. Data transmission in DL may happen per STTI via the SPDSCH, which may include a control region SPDCCH. In UL, data is transmitted per STTI via SPUSCH; control can be transmitted via SPUCCH.

Scheduling STTI

Different alternatives are possible to schedule a STTI in UL or DL to a UE. In one alternative, individual UEs receive information about SPDCCH candidates for short TTI via RRC configuration, telling the UE where to look for the control channel for short TTI, i.e. SPDCCH. The DCI for STTI is actually included directly in SPDCCH. In another alternative, the DCI for STTI is split into two parts, a slow DCI sent in PDCCH and a fast DCI sent in SPDCCH. The slow grant can contain the frequency allocation for a DL and an UL short TTI band to be used for short TTI operation, it can also contain refinement about SPDCCH candidate locations.

LTE Downlink Structure

In the time domain, 3GPP Long Term Evolution (LTE) downlink transmissions are organized into radio frames of 10 ms, each radio frame consisting of ten equally-sized subframes of length $T_{subframe}=1$ ms. This is shown in FIG. 1.

LTE technology is a mobile broadband wireless communication technology in which transmissions from base stations (referred to as eNBs) to mobile stations (referred to as user equipment (UE)) are sent using orthogonal frequency division multiplexing (OFDM). OFDM splits the signal into multiple parallel sub-carriers in frequency. The basic unit of transmission in LTE is a resource block (RB) which in its most common configuration consists of 12 subcarriers and 7 OFDM symbols (one slot) in the case of normal cyclic prefix. In the case of extended cyclic prefix, a RB consists of 6 OFDM symbols in the time domain. A common term is also a physical resource block (PRB) to indicate the RB in the physical resource. Two PRB in the same subframe that use the same 12 subcarriers are denoted a PRB pair. This is the minimum resource unit that can be scheduled in LTE.

Figure 2:
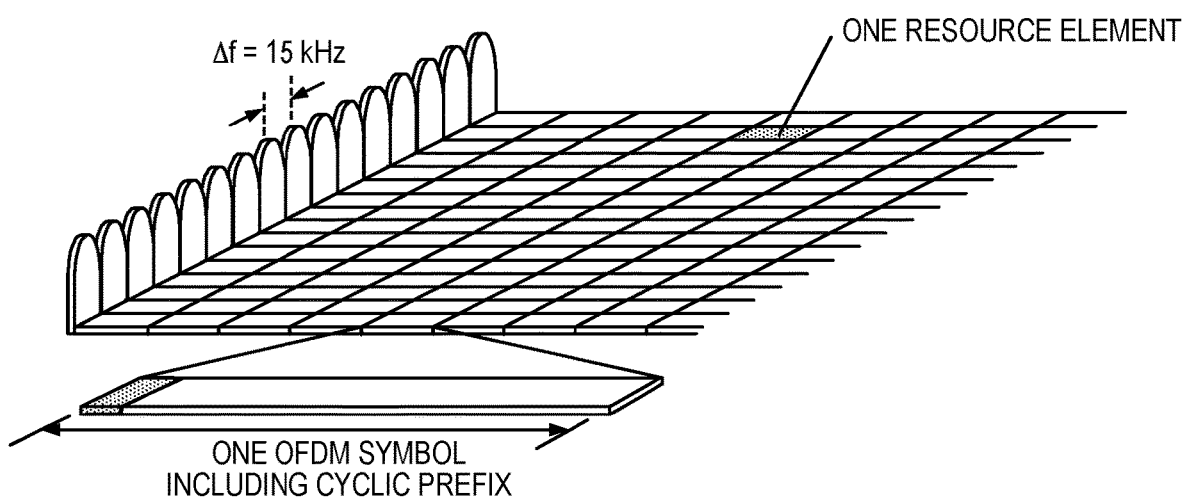
FIG. 2 illustrates the LTE downlink physical resource.

A unit of one subcarrier and 1 OFDM symbol is referred to as a resource element (RE) see FIG. 2. Thus, a PRB consists of 84 REs. An LTE radio subframe is composed of multiple resource blocks in frequency with the number of PRBs determining the bandwidth of the system and two slots in time see FIG. 3.

Messages transmitted over the radio link to users can be broadly classified as control messages or data messages. Control messages are used to facilitate the proper operation of the system as well as proper operation of each UE within the system. Control messages could include commands to control functions such as the transmitted power from a UE, signaling of RBs within which the data is to be received by the UE or transmitted from the UE and so on.

Figure 3:
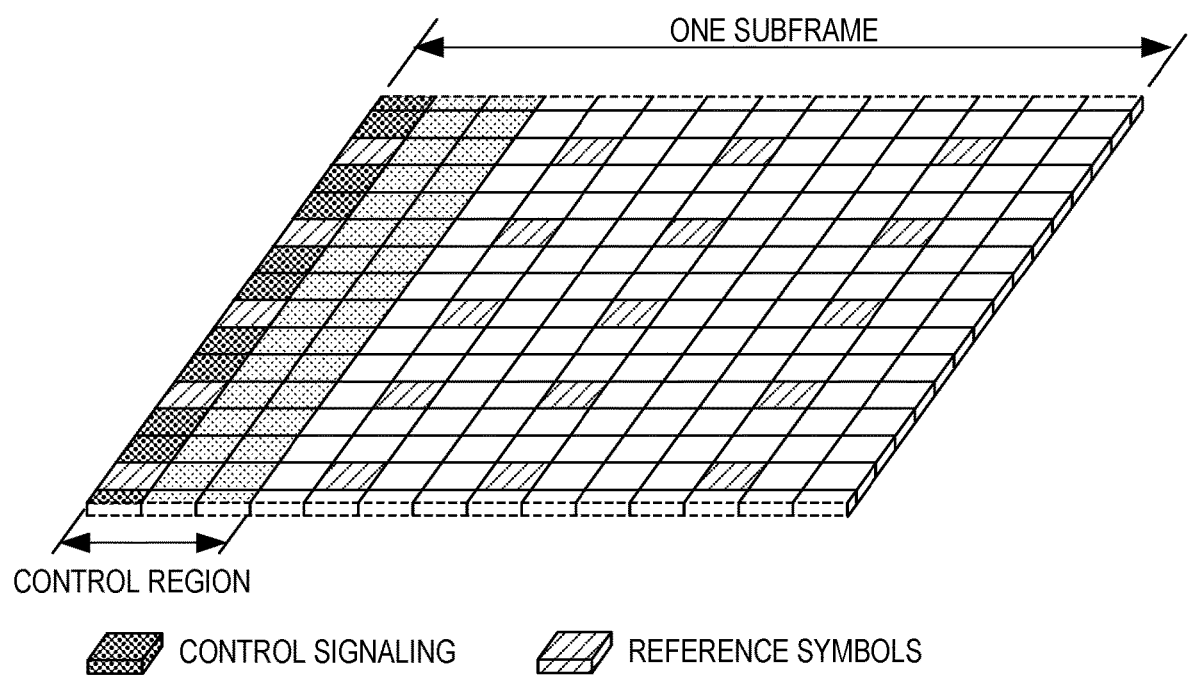
FIG. 3 illustrates a downlink subframe.

In Rel-8, the first one to four OFDM symbols, depending on the configuration, in a subframe are reserved to contain such control information, see FIG. 3. Furthermore, in Rel-11, an enhanced control channel was introduced (EPDCCH), in which PRB pairs are reserved to exclusively contain EPDCCH transmissions, although excluding from the PRB pair the one to four first symbols that may contain control information to UEs of releases earlier than Rel-11.

Hence, the EPDCCH is frequency multiplexed with PDSCH transmissions contrary to PDCCH which is time multiplexed with PDSCH transmissions. The resource allocation (RA) for PDSCH transmissions exists in several RA types, depending on the downlink control information (DCI) format. Some RA types has a minimum scheduling granularity of a resource block group (RBG), see TS 36.211. An RBG is a set of adjacent (in frequency) resource blocks and when scheduling the UE, the UE is allocated resources in terms of RBGs and not individual RBs.

When a UE is scheduled in the downlink from an EPDCCH, the UE shall assume that the PRB pairs carrying the DL assignment are excluded from the resource allocation, i.e. rate matching applies. For example, if a UE is scheduled PDSCH in a certain RBG of size 3 adjacent PRB pairs, and one of these PRB pairs contain the DL assignment, the UE shall assume that the PDSCH is only transmitted in the two remaining PRB pairs in this RBG. Note also that multiplexing of PDSCH and any EPDCCH transmission within a PRB pair is not supported in Rel-11.

The PDCCHs and EPDCCHs are transmitted over radio resources that are shared between several user equipments (UE). Each PDCCH consists of smaller parts, known as control channel elements (CCE), to enable link adaptation (by controlling the number of CCE a PDCCH is utilizing). It is specified that for PDCCH, a UE has to monitor 4 aggregation levels of CCEs, namely, 1, 2, 4, and 8, for UE-specific search space and 2 aggregation levels of CCEs, namely, 4 and 8, for common search space.

In TS 36.213, Section 9.1.1, a search space $S_k^{(L)}$ at aggregation level $L \in \{1,2,4,8\} L \in \{1,2,4,8\}$ is defined by a set of PDCCH candidates. For each serving cell on which PDCCH is monitored, the CCEs corresponding to PDCCH candidate m of the search space $S_k^{(L)}$ are given by $$L\{(Y_k+m') \bmod \lfloor N_{CCE,k}/L \rfloor\}$$

Where $i=0, \ldots, L-1$. For the common search space $m'=m$. For the PDCCH UE specific search space, if the UE is configured with carrier indicator field then $m'=m+M^{(L)}*n_{CI}$, where $n_{CI}$ is the carrier indicator field value, otherwise $m'=m$, when $m=0, \ldots, M^{(L)}-1$. $M^{(L)}$ is the number of PDCCH candidates to monitor in the given search space. Each CCE contains 36 QPSK modulation symbols. The value of $M^{(L)}$ is specified by Table 9.1.1-1 in 36.213, as shown below in Table 1.

TABLE 1

$M^{(L)}$ vs. Aggregation Level L for PDCCH

| Search space $S_k^{(L)}$ | | | Number of PDCCH |
|---|---|---|---|
| Type | Aggregation level $L$ | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

PDCCH Processing

After channel coding, scrambling, modulation and interleaving of the control information the modulated symbols are mapped to the resource elements in the control region. To multiplex multiple PDCCH onto the control region, control channel elements (CCE) has been defined, where each CCE maps to 36 resource elements. One PDCCH can, depending on the information payload size and the required level of channel coding protection, consist of 1, 2, 4, or 8 CCEs, and the number is denoted as the CCE aggregation level (AL). By choosing the aggregation level, link-adaptation of the PDCCH obtained. In total there are $N_{CCE}$ CCEs available for all the PDCCH to be transmitted in the subframe and the number $N_{CCE}$ varies from subframe to subframe depending on the number of control symbols n and the number of antenna ports configured.

Figure 4:
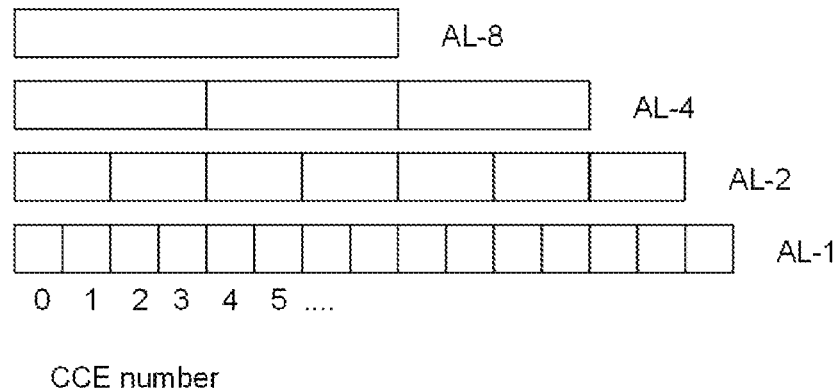
FIG. 4 illustrates CCE aggregation levels 8, 4, 2, and 1.

As $N_{CCE}$ varies from subframe to subframe, the terminal needs to blindly determine the position and the number of CCEs used for its PDCCH which can be a computationally intensive decoding task. Therefore, some restrictions in the number of possible blind decodings a terminal needs to go through have been introduced. For instance, the CCEs are numbered and CCE aggregation levels of size K can only start on CCE numbers evenly divisible by K, see FIG. 4.

Figure 5:
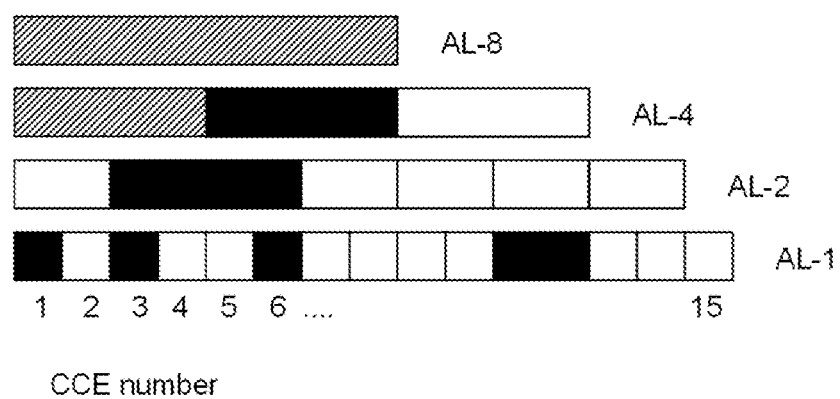
FIG. 5 illustrates a search space of FIG. 4 according to some embodiments.

The set of candidate control channels formed by CCEs where a terminal needs to blindly decode and search for a valid PDCCH are called search spaces. This is the set of CCEs on a AL a terminal should monitor for scheduling assignments or other control information, see example in FIG. 5. In each subframe and on each AL, a terminal will attempt to decode all the PDCCHs that can be formed from the CCEs in its search space. If the CRC checks, then the content of the PDCCH is assumed to be valid for the terminal and it further processes the received information. Often will two or more terminals have overlapping search spaces and the network has to select one of them for scheduling of the control channel. When this happens, the non-scheduled terminal is said to be blocked. The search spaces vary pseudo-randomly from subframe to subframe to minimize this blocking probability.

A search space is further divided to a common and a terminal specific part. In the common search space, the PDCCH containing information to all or a group of terminals is transmitted (paging, system information etc.). If carrier aggregation is used, a terminal will find the common search space present on the primary component carrier (PCC) only. The common search space is restricted to aggregation levels 4 and 8 to give sufficient channel code protection for all terminals in the cell (since it is a broadcast channel, link adaptation cannot be used). The $m_8$ and $m_4$ first PDCCH (with lowest CCE number) in an AL of 8 or 4 respectively belongs to the common search space. For efficient use of the CCEs in the system, the remaining search space is terminal specific at each aggregation level.

EPDCCH Details

Similar as for PDCCH, the EPDCCH is transmitted over radio resources shared by multiple UEs and enhanced CCE (eCCE) is introduced as the equivalent to CCE for PDCCH. An eCCE has also a fixed number of RE but the number of RE available for EPDCCH mapping is generally fewer than this fixed number because many RE are occupied by other signals such as CRS and CSI-RS. Code chain rate matching is applied whenever a RE belonging to a eCCE contains other colliding signals such as the CRS, CSI-RS, legacy control region or in case of TDD, the GP and UpPTS 36.211.

In Rel-11, the EPDCCH supports only the UE specific search space whereas the common search space remains to be monitored in the PDCCH in the same subframe. In future releases, the common search space may be introduced also for EPDCCH transmission.

It is specified that the UE monitors eCCE aggregation levels 1, 2, 4, 8, 16, and 32 with restrictions shown.

In distributed transmission, an EPDCCH is mapped to resource elements in up to D PRB pairs, where D=2, 4, or 8 (the value of D=16 is also being considered in 3GPP). In this way can frequency diversity be achieved for the EPDCCH message. In localized transmission, an EPDCCH is mapped to one PRB pair only, if the space allows (which is always possible for aggregation level one and two and for normal subframes and normal CP length also for level four). In case the aggregation level of the EPDCCH is too large, a second PRB pair is used as well, and so on, using more PRB pairs, until all eCCE belonging to the EPDCCH has been mapped.

To facilitate the mapping of eCCEs to physical resources each PRB pair is divided into 16 enhanced resource element groups (eREGs) and each eCCE is split into 4 or 8 eREGs for normal and extended cyclic prefix, respectively. An EPDCCH is consequently mapped to a multiple of four or eight eREGs depending on the aggregation level.

These eREG belonging to an ePDCCH resides in either a single PRB pair (as is typical for localized transmission) or a multiple of PRB pairs (as is typical for distributed transmission).

Assignment of EPDCCH Candidates

A UE is configured by higher layers with one or two EPDCCH-PRB-sets for EPDCCH monitoring, as described in 36.213. Each EPDCCH-PRB-set consists of a set of ECCEs numbered from 0 to $N_{ECCE,p,k}-1$, where $N_{ECCE,p,k}$ is the number of ECCEs in EPDCCH-PRB-set p of subframe k.

The UE shall monitor a set of EPDCCH candidates, that is, attempting to decode each of the possible EPDCCHs, at different aggregation levels, within the set. The set of EPDCCH candidates to monitor are defined in terms of EPDCCH UE-specific search spaces.

The ECCEs corresponding to an EPDCCH candidate m of the UE-specific search space are given by the following formulation:

$$L\left\{\left(Y_{p,k} + \left\lfloor \frac{m \cdot N_{ECCE,p,k}}{L \cdot M_p^{(L)}} \right\rfloor + b\right) mod \lfloor N_{ECCE,p,k}/L \rfloor\right\} + \quad (L)$$

Where $Y_{p,k}$ refers to UE RNTI based offset, L is aggregation level, i=0, . . . , L−1, b is equal to the carrier indicator field value (if the UE is configured with it, otherwise b=0), m=0, 1, . . . , $M_p^{(L)}-1$, and $M_p^{(L)}$ is the number of EPDCCH candidates to monitor at aggregation level L in EPDCCH-PRB-set p.

SPDCCH for STTI

In order to quickly schedule low latency data on the short TTIs, a new Short PDCCH (SPDCCH) needs to be defined. Since the Short TTI operation is desired to co-exist with legacy TTI operation, the SPDCCH should be placed in-band within PDSCH, still leaving resources for legacy data.

Legacy control channels PDCCH and EPDCCH use CRS and DMRS demodulation, respectively. For operation in both these environment, an SPDCCH should support both CRS and DMRS, and to maintain efficiently, resources not used by SPDCCH should be used by SPDSCH (Short PDSCH).

To facilitate the definition of the SPDCCH mapping to resource elements special entities are defined: short resource element groups (SREG) and short control channel elements (SCCE). This follows the methodology used so far in the LTE specifications for defining PDCCH and ePDCCH, as described in previous section. Note that the definition of the same mapping can also be done without using these terms or by using equivalent terms.

SREG Configuration

The length for SPDCCH in time domain has defined to be 1 or 2 OFDM symbols for CRS-based SPDCCH for both 2 OFDM symbol (os) STTI and 1-slot STTI. For DMRS-based SPDCCH, and 2 or 3 OFDM symbols have been defined for 2os STTI and 2 OFDM symbols for 1-slot STTI.

An SREG has been defined as 1 RB within 1 OFDM symbol including REs for CRS and/or DMRS applied to DMRS based SPDCCH.

Figure 6:
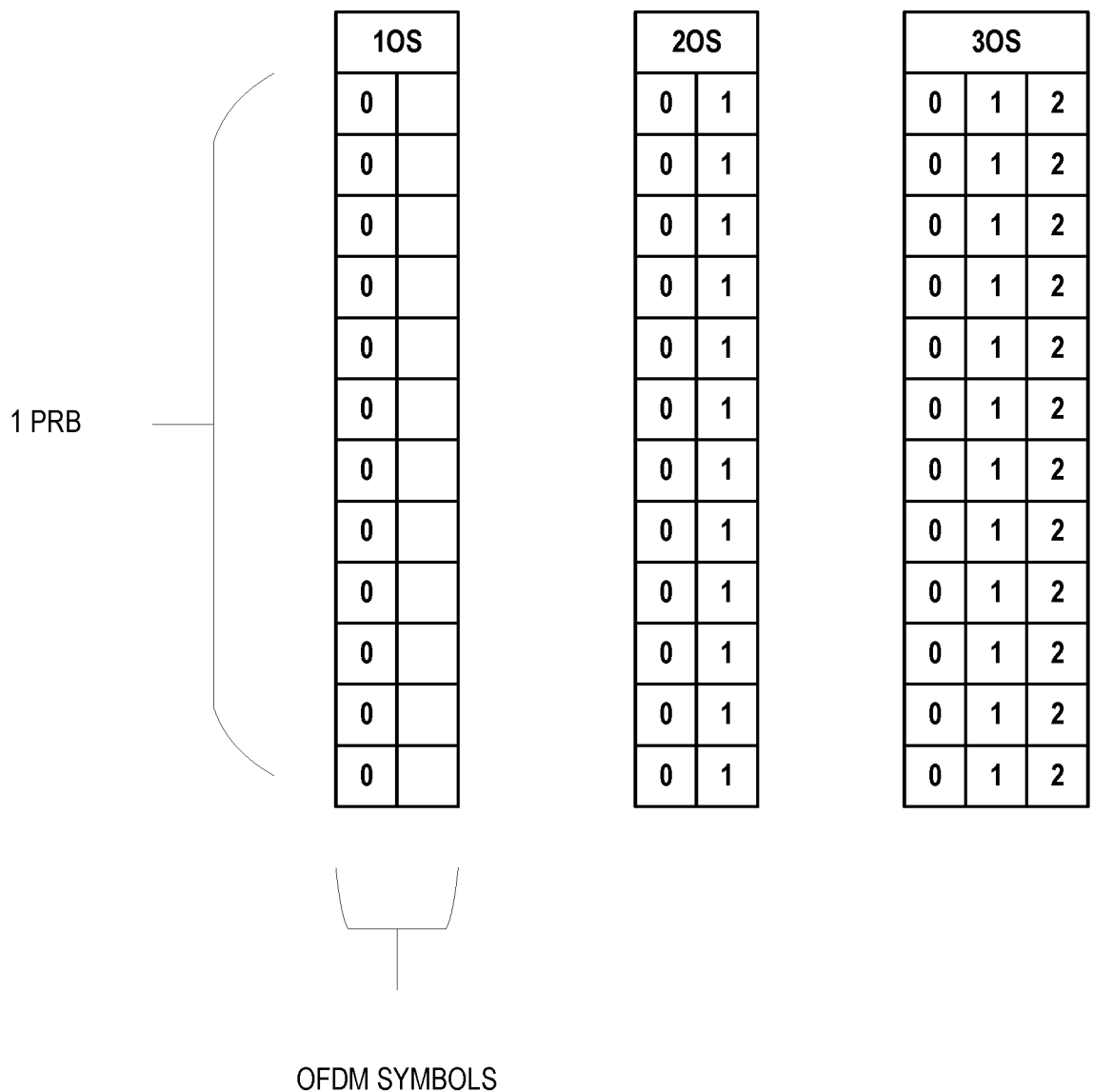
FIG. 6 illustrates an SREG configuration based on twelve REs according to some embodiments.

The SREG configuration for SPDCCH is then defined as the complete number of REs in a PRB within 1 OFDM symbol (i.e., 12 REs per SREG in 1 OFDM symbol). Therefore, depending on the SPDCCH length, one or more SREG are included in a RB, as depicted in FIG. 6. FIG. 6 shows the number of SREG considering 1 OFDM symbol SPDCCH, 2 OFDM symbol SPDCCH and 3 OFDM symbol SPDCCH. Each index, i.e. {0, 1, 2}, represents an SREG group.

SCCE Configuration

The number of SREG required to build up an SCCE for a given SPDCCH can vary as well as their placement scheme along the frequency resources used for STTI operation. For CRS-based SPDCCH, an SCCE has been defined to be composed by four SREG, i.e., 1 SCCE=4 SREG. For DMRS-based SPDCCH, some options have been considered for the SCCE definition based on the STTI length. For 2os STTI and 1-slot STTI, an SCCE might be defined to be composed by four SREG, i.e., 1 SCCE=4 SREG. For the case of 3os STTI length, an SCCE might be defined to be composed by six SREG, i.e. 1 SCCE=6 SREG. This is assuming that DMRS bundling over 2 PRBs is always applied for DMRS-based SPDCCH.

In order to support good frequency diversity, or a more localized placement, localized and distributed placement schemes of SREG building up the same SCCE are defined:

Localized scheme: SREGs building the same SCCE can be localized in frequency domain to allow for a SPDCCH resource allocation confined in a limited frequency band. This facilitates the use of beamforming for DMRS based SPDCCH.

Distributed scheme: A distributed SREG location can be used to allow frequency diversity gains. In this case, multiple UEs may have the SREG of their SPDCCH mapped to the same PRB on different REs. Distributing over a wide frequency range also more easily makes the SPDCCH fit into one single OFDM symbol. For UEs with DMRS based demodulation, user-specific beamforming is not recommended with distributed SCCE locations.

Furthermore, based on the demodulation scheme, these schemes have been defined as follows:

For an RB set configured with more than 1 symbol and for CRS based SPDCCH, the localized and distributed SCCE-to-SREG mapping is defined adopting a frequency-first time-second SCCE-to-SREG mapping. This means, that a SCCE is built first in frequency domain and then in time domain.

For an RB set configured with more than 1 symbol and for DMRS based SPDCCH, the localized and distributed SCCE-to-SREG mapping is defined adopting a time-first frequency-second SCCE-to-SREG mapping. This means, that a SCCE is built first in time domain and then in frequency domain.

Configuration of PRBs that can be Used for SPDCCH

Up to two sets of PRB that can be used for SPDCCH are configured per user. It has been recommended to support the configuration of several sets of PRBs used for SPDCCH in order to configure one set of PRBs following the localized SPDCCH mapping and another set with the distributed mapping. The UE would monitor both sets and the eNB could select the most favorable configuration/PRB set for a given STTI and UE.

The set of PRB assigned for the SPDCCH, which includes PRBs (no necessarily consecutive) from the available STTI band, may be configured via RRC signaling. The set of PRBs are configured by the eNB using a combinatorial index which allows full flexibility to allocate any PRB in the DL system bandwidth within the required set.

The configured PRB set consists then of a set of SCCEs numbered sequentially based on the total number of SCCEs forming the PRB set. Furthermore, since multiple SPDCCH candidates can be configured within the same SPDCCH PRB set, different UEs should be able to share the same PRB set. Hence, the eNB obtains enough flexibility for multiplexing the SDCI of several UEs.

Problems with Existing Solutions

An efficient design still needs to be defined for the SCCE to SREG mapping in STTI operation. For that, the demodulation schemes for SPDCCH, i.e. either CRS-based or DMRS-based, need to be considered as well as if a localized or distributed configuration is required.

In many of the embodiments disclosed herein, it is assumed that SPDCCH parameters have been pre-configured over higher layer signaling such as RRC for LTE or pre-defined, e.g. in the LTE specifications. Typical SPDCCH parameters are the number of time resources, e.g. OFDM symbols, aggregation levels and nominal number of candidates per aggregation level used for SPDCCH transmission to be monitored by UE. As an example for the Short TTI (STTI) operation, the pre-configured or pre-defined number of OFDM symbols (OS) for SPDCCH can be 1, 2, or 3 in the following description. As an example for STTI operation, the aggregation levels can be considered up to eight (i.e. AL 1, 2, 4, and 8). Besides, a UE is configured at least in one SPDCCH RB set containing a number of SCCE. As examples in some embodiments of this disclosure, SPDCCH RB sets are considered with a size of 8 SCCE and 4 SCCE.

SCCE to SREG Mapping for CRS-Based SPDCCH

SPDCCH RB set is configured based on CRS or DMRS demodulation. Based on this, a CRS-based SPDCCH RB set configured with more than 1 symbol, the distributed and localized mapping is based on a frequency-first time-second SCCE to SREG mapping. Besides, as described before, an SCCE has been defined to be composed by four SREG, i.e. 1 SCCE=4 SREG.

Therefore, to define the SCCE to SREG mapping, as one embodiment, the SREG indexing for CRS-based SPDCCH, i.e. how the SREG which can be formed in the UE's SPDCCH RB set are numbered, are also defined as frequency-first time-second, for both 1 OFDM symbol (os) and 2os CRS-based SPDCCH.

For that, the SREGs are numbered in an ascended frequency-first time-second manner from 0 to $N_{sREG_{tot}}-1$ within a CRS-based SPDCCH RB set. $N_{sREG_{tot}}$ is the total number of SREGs that can be formed in the SPDCCH RB set. Besides, to achieve high frequency diversity for a CRS-based SPDCCH, the distributed CRS-based configuration is done at SREG level. For that, the SREG corresponding to an SCCE are selected in a distributed manner along the SPDCCH RB set as well as only from 1 OFDM symbol.

Figure 7:
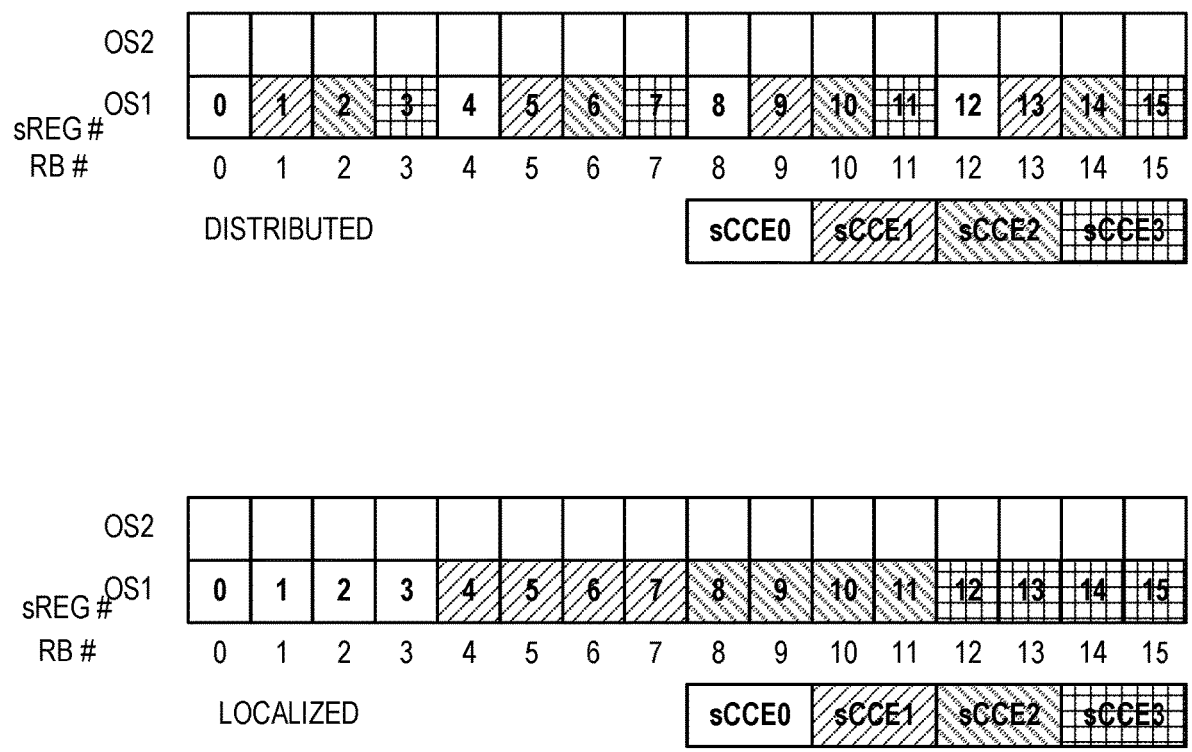
FIG. 7 illustrates distributed and localized configurations for 1os CRS-based SPDCCH, according to some embodiments.

FIG. 7 and FIG. 8 show the aforementioned SREG indexing definition and the distributed and localized SCCE to SREG mapping definition for 1os and 2os CRS-based SPDCCH RB set, respectively. Here, an example of a SPDCCH RB set size of 4 SCCEs is depicted.

According to some embodiments, the following is defined for CRS-based SPDCCH:
I. For the distributed SCCE to SREG mapping in 1os CRS-based SPDCCH, the SREGs corresponding to an SCCE index k are given by the following definition:

$$k + i * \frac{N_{sREG_{tot}}}{N_{sREG/sCCE}}$$

Where k=0, ..., $N_{sCCE}$−1, $N_{sCCE}$ is the number of SCCE in the SPDCCH RB set, i=0, ..., $N_{sREG/sCCE}$−1, $N_{sREG_{tot}}$ is the total number of SREGs in the SPDCCH RB set, and $N_{sREG/sCCE}$ is the number of SREG per SCCE, i.e. 4 SREG/SCCE for CRS-based SPDCCH.

II. For the SREG based distributed mapping in 2os CRS-based SPDCCH, the SREGs corresponding to an SCCE index k are given by the following definition:

$$k \bmod N_{sCCE/OS} + \left\lfloor \frac{k}{N_{sCCE/OS}} \right\rfloor * N_{\overline{sREG\ OS}} + i * N_{sCCE/OS}$$

Where k=0, ..., $N_{sCCE}$−1, $N_{sCCE}$ is the number of SCCE in the SPDCCH RB set, i=0, ..., $N_{sREG/sCCE}$−1, $N_{sCCE/OS}$ is the number of SCCEs per OFDM symbol within the SPDCCH RB set, i.e. $N_{sCCE/OS} = \frac{N_{sREG/OS}}{N_{sREG/sCCE}}$.

$N_{sREG/OS}$ is the number of SREGs per OFDM symbol and $N_{sREG/sCCE}$ is the number of SREG per SCCE, i.e. 4 SREG/SCCE for CRS-based SPDCCH.

III. For the SREG based localized mapping within 1os and 2os CRS-based SPDCCH, the SREGs corresponding to an SCCE index k are given by the following definition:

$$k * N_{sREG/sCCE} + i$$

Where k=0, ..., $N_{sCCE}$−1, $N_{sCCE}$ is the number of SCCE in the SPDCCH RB set, i=0, ..., $N_{sREG/sCCE}$−1, and $N_{sREG/sCCE}$ is the number of SREG per SCCE, i.e. 4 SREG/SCCE for CRS-based SPDCCH SCCE to SREG Mapping for DMRS-Based SPDCCH As described above, a UE can be configured to monitor up to two SPDCCH RB sets per STTI. Each SPDCCH RB set is configured based on CRS or DMRS demodulation. Based on this, a DMRS-based SPDCCH RB set configured with more than 1 symbol, the distributed and localized mapping is based on a time-first frequency-second mapping. Besides, as described before, for DMRS-based SPDCCH, some options have been considered for the SCCE definition based on the STTI length. For 2os STTI and 1-slot STTI, an SCCE might be defined to be composed by four SREG, i.e. 1 SCCE=4 SREG. For the case of 3os STTI length, an SCCE might be defined to be composed by six SREG, i.e. 1 SCCE=6 SREG. This is assuming that DMRS bundling over 2 PRBs is always applied for DMRS-based SPDCCH.

Therefore, to define the SCCE to SREG mapping, as one embodiment, the SREG indexing for DMRS-based SPDCCH, i.e. how the SREG which can be formed in the UE's SPDCCH RB set are numbered, are also defined as time-first frequency-second, for both 1 OFDM symbol (os) and 2os CRS-based SPDCCH.

For that, the SREGs are numbered in an ascended time-first frequency-second manner from 0 to N_(SREG_tot)−1 within a DMRS-based SPDCCH RB set. N_(SREG_tot) is the total number of SREGs that can be formed in the SPDCCH RB set.

Furthermore, assuming that DMRS bundling over 2 PRBs is always applied for DMRS-based, 4 SREG/SCCE and 6 SREG/SCCE are then considered for 2os and 3os DMRS-based SPDCCH, respectively. Based on this, an SCCE is built by those two bundled PRB, i.e. by the SREGs formed within the bundled PRBs. Thereby, an SCCE is built always with a localized SREG configuration.

Figure 9:
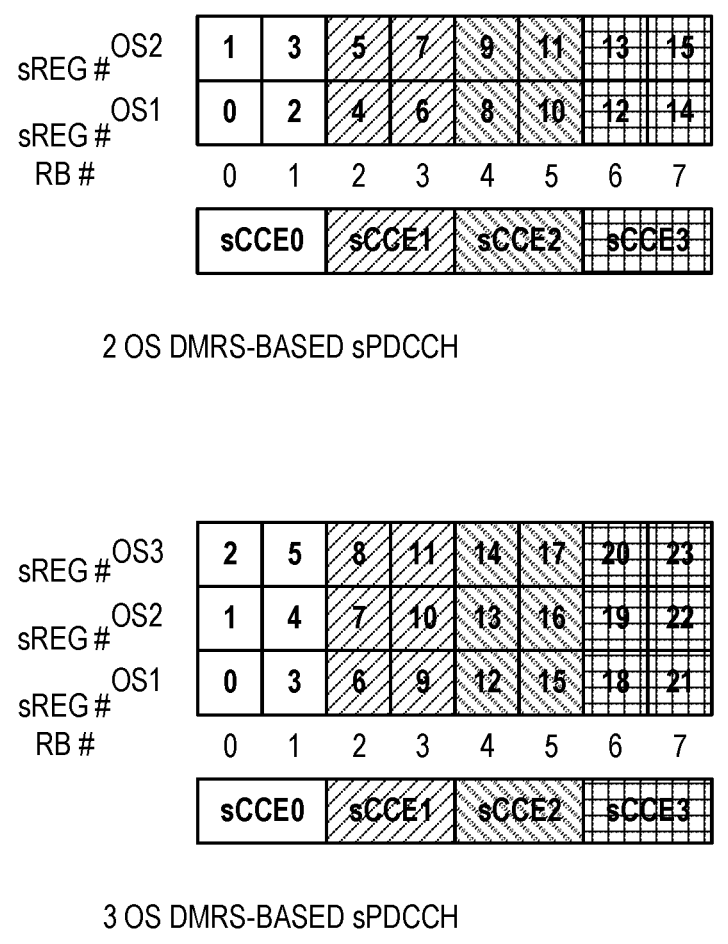

FIG. 9 shows the aforementioned SREG indexing definition and the SCCE to SREG mapping definition for 2os and 3os DMRS-based SPDCCH RB set. Here, an example of a SPDCCH RB set size of 4 SCCEs is depicted. Since DMRS bundling over 2 PRB is assumed, the physical RBs building an SCCE are, therefore, two consecutive PRBs in frequency domain.

Hence, as an embodiment, the following is defined for DMRS-based SPDCCH:
I. For the SCCE to SREG mapping in 2os and 3os DMRS-based SPDCCH, the SREGs corresponding to an SCCE index k are given by the following definition:

$$k * N_{sREG/sCCE} + i$$

Where k=0, ..., $N_{sCCE}$−1, $N_{sCCE}$ is the number of SCCE in the SPDCCH RB set, i=0, ..., $N_{sREG/sCCE}$−1 and $N_{sREG/sCCE}$ is the number of SREG per SCCE, i.e. 4 SREG/SCCE for 2os DMRS-based SPDCCH and 6 SREG/SCCE for 3os DMRS-based SPDCCH.

Distributed DMRS-Based SPDCCH Configuration

As described, an SCCE is built always with a localized SREG configuration. Therefore, a distributed DMRS-based SPDCCH configuration needs to be done at SCCE level. This means that the SCCE corresponding to an SPDCCH candidate are selected in a distributed manner in the SPDCCH RB set. Based on this, it becomes obvious that a distributed DMRS-based configuration is defined only at aggregation levels higher than one, i.e. SPDCCH candidates at aggregation levels containing more than one SCCE.

Hence, as an embodiment, for an aggregation level higher than one, the SCCEs corresponding to a distributed DMRS-based SPDCCH candidate m within the UE's SPDCCH RB set is defined as follows:

$$Y_{p,k}^L + m + i * \frac{N_{sCCE}}{L}$$

where $Y_{p,k}^L$ is a UE's SCCE starting offset configured by higher layer signaling, i=0, ..., L−1. L is the aggregation level and is higher than one, $N_{sCCE}$ is the total number of SCCEs in the SPDCCH RB set, and m=0, ..., $M^L$−1. $M^L$ is the number of SPDCCH candidates per aggregation level L.

Figure 10:
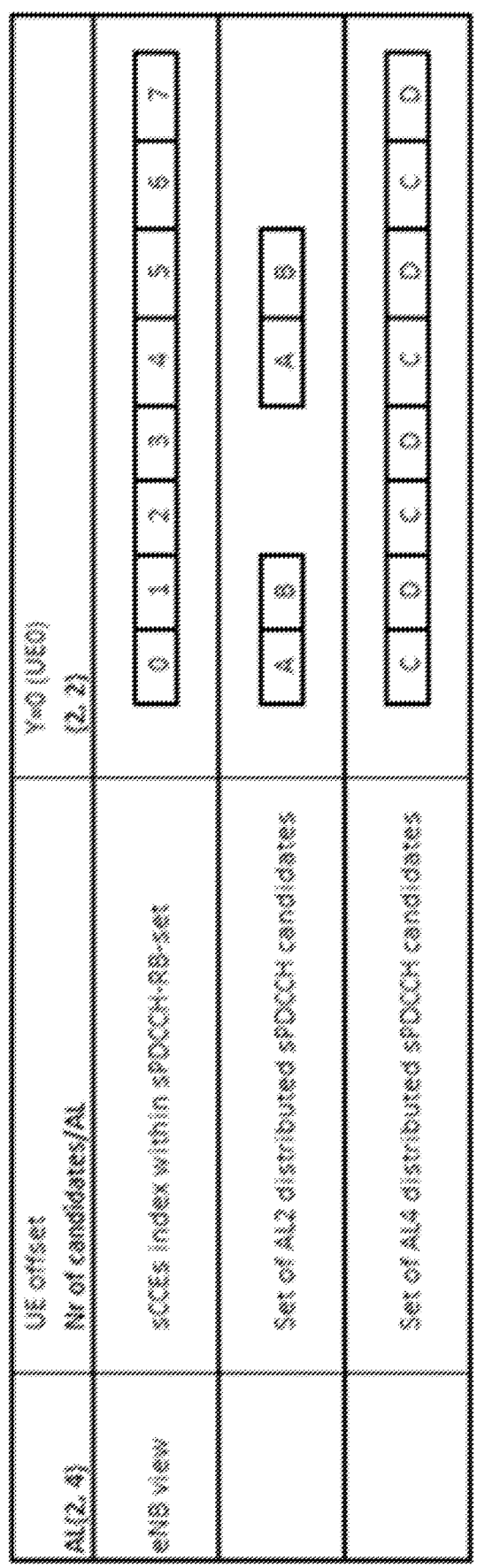
FIG. 10 illustrates an example of distributed DMRS-based SPDCCH candidates for one UE, according to some embodiments.

FIG. 10 depicts an example of a UE configured with an SPDCCH RB set of 8 SCCE size, aggregation levels (AL) {2, 4} and the number of candidates per AL $M^L$={2, 2}. The resulting SPDCCH candidates {A, B} represent AL2 candidates, wherein A corresponds to candidate m=0, and B to m=1. Likewise, {C, D} represent AL4 candidates. For instance, as shown below, AL2 candidate A is formed by selecting in a distributed manner SCCE0 and SCCE4. On the same way, AL4 candidate C is formed by selecting in a distributed manner SCCE0, SCCE2, SCCE4 and SCCE6.

Figure 11:
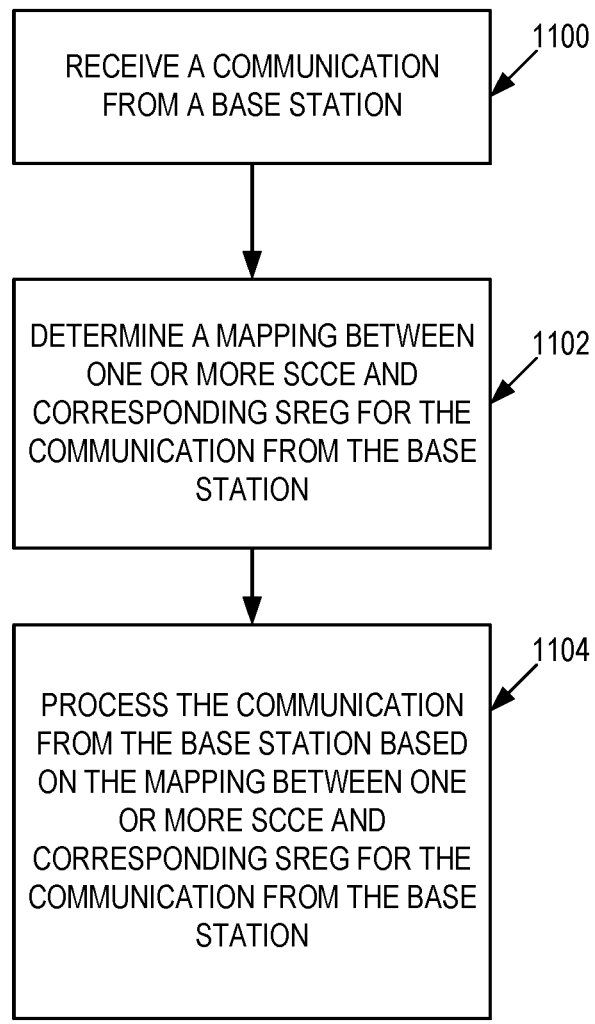
FIG. 11 illustrates a method of operating a UE, according to some embodiments.

FIG. 11 illustrates a method of operating a UE, according to some embodiments. The UE receives a communication from a base station (step 1100). The UE also determines a mapping between one or more SCCE and corresponding SREG for the communication from the base station (step 1102). The UE processes the communication from the base station based on the mapping between one or more SCCE and corresponding SREG for the communication from the base station (step 1104).

Figure 12:
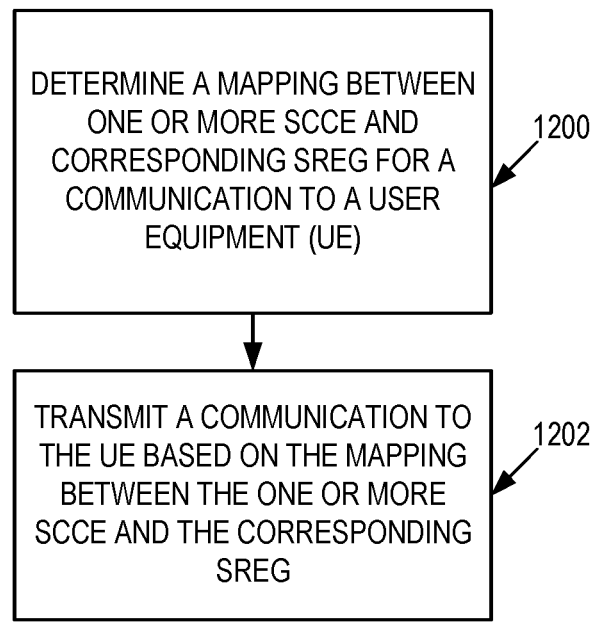
FIG. 12 illustrates a method of operating a base station, according to some embodiments.

FIG. 12 illustrates a method of operating a base station, according to some embodiments. The base station determines a mapping between one or more SCCE and corresponding SREG for a communication to a UE (step 1200). The base station transmits a communication to the UE based on the mapping between the one or more SCCE and the corresponding SREG (step 1202).

Figure 13:
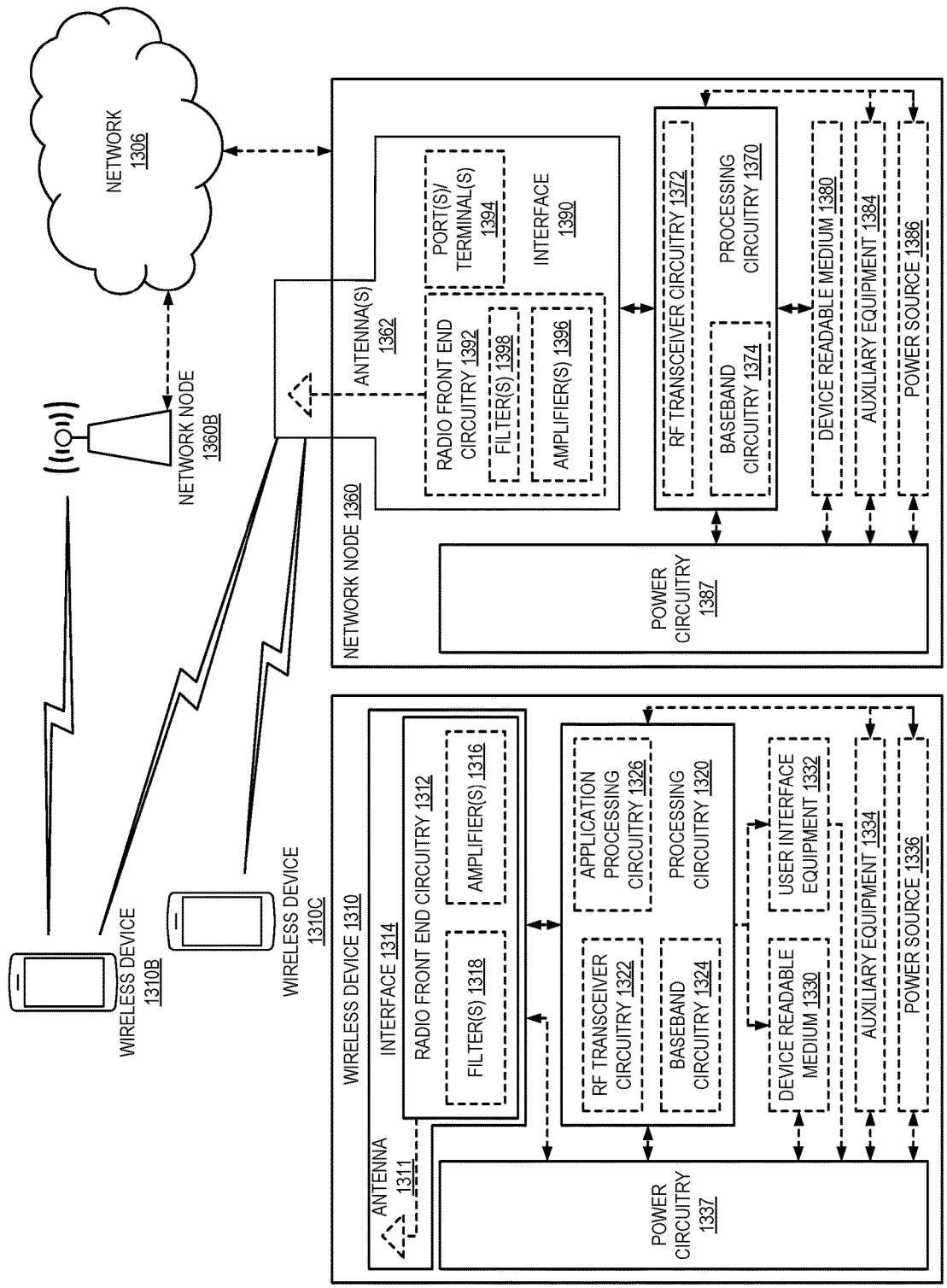
FIG. 13 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 13. For simplicity, the wireless network of FIG. 13 only depicts network 1306, network nodes 1360 and 1360b, and WDs 1310, 1310b, and 1310c. In practice, a wireless network may further include any additional elements suitable to support communication between wireless devices or between a wireless device and another communication device, such as a landline telephone, a service provider, or any other network node or end device. Of the illustrated components, network node 1360 and wireless device (WD) 1310 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1306 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1360 and WD 1310 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 13, network node 1360 includes processing circuitry 1370, device readable medium 1380, interface 1390, auxiliary equipment 1384, power source 1386, power circuitry 1387, and antenna 1362. Although network node 1360 illustrated in the example wireless network of FIG. 13 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1360 are depicted as single boxes located within a larger box, or nested within multiple boxes, in practice, a network node may comprise multiple different physical components that make up a single illustrated component (e.g., device readable medium 1380 may comprise multiple separate hard drives as well as multiple RAM modules).

Similarly, network node 1360 may be composed of multiple physically separate components (e.g., a NodeB component and a RNC component, or a BTS component and a BSC component, etc.), which may each have their own respective components. In certain scenarios in which network node 1360 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1360 may be configured to support multiple radio access technologies (RATs). In such embodiments, some components may be duplicated (e.g., separate device readable medium 1380 for the different RATs) and some components may be reused (e.g., the same antenna 1362 may be shared by the RATs). Network node 1360 may also include multiple sets of the various illustrated components for different wireless technologies integrated into network node 1360, such as, for example, GSM, WCDMA, LTE, NR, WiFi, or Bluetooth wireless technologies. These wireless technologies may be integrated into the same or different chip or set of chips and other components within network node 1360.

Processing circuitry 1370 is configured to perform any determining, calculating, or similar operations (e.g., certain obtaining operations) described herein as being provided by a network node. These operations performed by processing circuitry 1370 may include processing information obtained by processing circuitry 1370 by, for example, converting the obtained information into other information, comparing the obtained information or converted information to information stored in the network node, and/or performing one or more operations based on the obtained information or converted information, and as a result of said processing making a determination.

Processing circuitry 1370 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1360 components, such as device readable medium 1380, network node 1360 functionality. For example, processing circuitry 1370 may execute instructions stored in device readable medium 1380 or in memory within processing circuitry 1370. Such functionality may include providing any of the various wireless features, functions, or benefits discussed herein. In some embodiments, processing circuitry 1370 may include a system on a chip (SOC).

In some embodiments, processing circuitry 1370 may include one or more of radio frequency (RF) transceiver circuitry 1372 and baseband processing circuitry 1374. In some embodiments, radio frequency (RF) transceiver circuitry 1372 and baseband processing circuitry 1374 may be on separate chips (or sets of chips), boards, or units, such as radio units and digital units. In alternative embodiments, part or all of RF transceiver circuitry 1372 and baseband processing circuitry 1374 may be on the same chip or set of chips, boards, or units In certain embodiments, some or all of the functionality described herein as being provided by a network node, base station, eNB or other such network device may be performed by processing circuitry 1370 executing instructions stored on device readable medium 1380 or memory within processing circuitry 1370. In alternative embodiments, some or all of the functionality may be provided by processing circuitry 1370 without executing instructions stored on a separate or discrete device readable medium, such as in a hard-wired manner. In any of those embodiments, whether executing instructions stored on a device readable storage medium or not, processing circuitry 1370 can be configured to perform the described functionality. The benefits provided by such functionality are not limited to processing circuitry 1370 alone or to other components of network node 1360, but are enjoyed by network node 1360 as a whole, and/or by end users and the wireless network generally.

Device readable medium 1380 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1370. Device readable medium 1380 may store any suitable instructions, data or information, including a computer program, software, an application including one or more of logic, rules, code, tables, etc. and/or other instructions capable of being executed by processing circuitry 1370 and, utilized by network node 1360. Device readable medium 1380 may be used to store any calculations made by processing circuitry 1370 and/or any data received via interface 1390. In some embodiments, processing circuitry 1370 and device readable medium 1380 may be considered to be integrated.

Interface 1390 is used in the wired or wireless communication of signalling and/or data between network node 1360, network 1306, and/or WDs 1310. As illustrated, interface 1390 comprises port(s)/terminal(s) 1394 to send and receive data, for example to and from network 1306 over a wired connection. Interface 1390 also includes radio front end circuitry 1392 that may be coupled to, or in certain embodiments a part of, antenna 1362. Radio front end circuitry 1392 comprises filters 1398 and amplifiers 1396. Radio front end circuitry 1392 may be connected to antenna 1362 and processing circuitry 1370. Radio front end circuitry may be configured to condition signals communicated between antenna 1362 and processing circuitry 1370. Radio front end circuitry 1392 may receive digital data that is to be sent out to other network nodes or WDs via a wireless connection. Radio front end circuitry 1392 may convert the digital data into a radio signal having the appropriate channel and bandwidth parameters using a combination of filters 1398 and/or amplifiers 1396. The radio signal may then be transmitted via antenna 1362. Similarly, when receiving data, antenna 1362 may collect radio signals which are then converted into digital data by radio front end circuitry 1392. The digital data may be passed to processing circuitry 1370. In other embodiments, the interface may comprise different components and/or different combinations of components.

In certain alternative embodiments, network node 1360 may not include separate radio front end circuitry 1392, instead, processing circuitry 1370 may comprise radio front end circuitry and may be connected to antenna 1362 without separate radio front end circuitry 1392. Similarly, in some embodiments, all or some of RF transceiver circuitry 1372 may be considered a part of interface 1390. In still other embodiments, interface 1390 may include one or more ports or terminals 1394, radio front end circuitry 1392, and RF transceiver circuitry 1372, as part of a radio unit (not shown), and interface 1390 may communicate with baseband processing circuitry 1374, which is part of a digital unit (not shown).

Antenna 1362 may include one or more antennas, or antenna arrays, configured to send and/or receive wireless signals. Antenna 1362 may be coupled to radio front end circuitry 1390 and may be any type of antenna capable of transmitting and receiving data and/or signals wirelessly. In some embodiments, antenna 1362 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1362 may be separate from network node 1360 and may be connectable to network node 1360 through an interface or port.

Antenna 1362, interface 1390, and/or processing circuitry 1370 may be configured to perform any receiving operations and/or certain obtaining operations described herein as being performed by a network node. Any information, data and/or signals may be received from a wireless device, another network node and/or any other network equipment. Similarly, antenna 1362, interface 1390, and/or processing circuitry 1370 may be configured to perform any transmitting operations described herein as being performed by a network node. Any information, data and/or signals may be transmitted to a wireless device, another network node and/or any other network equipment.

Power circuitry 1387 may comprise, or be coupled to, power management circuitry and is configured to supply the components of network node 1360 with power for performing the functionality described herein. Power circuitry 1387 may receive power from power source 1386. Power source 1386 and/or power circuitry 1387 may be configured to provide power to the various components of network node 1360 in a form suitable for the respective components (e.g., at a voltage and current level needed for each respective component). Power source 1386 may either be included in, or external to, power circuitry 1387 and/or network node 1360. For example, network node 1360 may be connectable to an external power source (e.g., an electricity outlet) via an input circuitry or interface such as an electrical cable, whereby the external power source supplies power to power circuitry 1387. As a further example, power source 1386 may comprise a source of power in the form of a battery or battery pack which is connected to, or integrated in, power circuitry 1387. The battery may provide backup power should the external power source fail. Other types of power sources, such as photovoltaic devices, may also be used.

Alternative embodiments of network node 1360 may include additional components beyond those shown in FIG. 13 that may be responsible for providing certain aspects of the network node's functionality, including any of the functionality described herein and/or any functionality necessary to support the subject matter described herein. For example, network node 1360 may include user interface equipment to allow input of information into network node 1360 and to allow output of information from network node 1360. This may allow a user to perform diagnostic, maintenance, repair, and other administrative functions for network node 1360.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1310 includes antenna 1311, interface 1314, processing circuitry 1320, device readable medium 1330, user interface equipment 1332, auxiliary equipment 1334, power source 1336 and power circuitry 1337. WD 1310 may include multiple sets of one or more of the illustrated components for different wireless technologies supported by WD 1310, such as, for example, GSM, WCDMA, LTE, NR, WiFi, WiMAX, or Bluetooth wireless technologies, just to mention a few. These wireless technologies may be integrated into the same or different chips or set of chips as other components within WD 1310.

Antenna 1311 may include one or more antennas or antenna arrays, configured to send and/or receive wireless signals, and is connected to interface 1314. In certain alternative embodiments, antenna 1311 may be separate from WD 1310 and be connectable to WD 1310 through an interface or port. Antenna 1311, interface 1314, and/or processing circuitry 1320 may be configured to perform any receiving or transmitting operations described herein as being performed by a WD. Any information, data and/or signals may be received from a network node and/or another WD. In some embodiments, radio front end circuitry and/or antenna 1311 may be considered an interface.

As illustrated, interface 1314 comprises radio front end circuitry 1312 and antenna 1311. Radio front end circuitry 1312 comprise one or more filters 1318 and amplifiers 1316. Radio front end circuitry 1314 is connected to antenna 1311 and processing circuitry 1320, and is configured to condition signals communicated between antenna 1311 and processing circuitry 1320. Radio front end circuitry 1312 may be coupled to or a part of antenna 1311. In some embodiments, WD 1310 may not include separate radio front end circuitry 1312; rather, processing circuitry 1320 may comprise radio front end circuitry and may be connected to antenna 1311. Similarly, in some embodiments, some or all of RF transceiver circuitry 1322 may be considered a part of interface 1314. Radio front end circuitry 1312 may receive digital data that is to be sent out to other network nodes or WDs via a wireless connection. Radio front end circuitry 1312 may convert the digital data into a radio signal having the appropriate channel and bandwidth parameters using a combination of filters 1318 and/or amplifiers 1316. The radio signal may then be transmitted via antenna 1311. Similarly, when receiving data, antenna 1311 may collect radio signals which are then converted into digital data by radio front end circuitry 1312. The digital data may be passed to processing circuitry 1320. In other embodiments, the interface may comprise different components and/or different combinations of components.

Processing circuitry 1320 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1310 components, such as device readable medium 1330, WD 1310 functionality. Such functionality may include providing any of the various wireless features or benefits discussed herein. For example, processing circuitry 1320 may execute instructions stored in device readable medium 1330 or in memory within processing circuitry 1320 to provide the functionality disclosed herein.

As illustrated, processing circuitry 1320 includes one or more of RF transceiver circuitry 1322, baseband processing circuitry 1324, and application processing circuitry 1326. In other embodiments, the processing circuitry may comprise different components and/or different combinations of components. In certain embodiments processing circuitry 1320 of WD 1310 may comprise a SOC. In some embodiments, RF transceiver circuitry 1322, baseband processing circuitry 1324, and application processing circuitry 1326 may be on separate chips or sets of chips. In alternative embodiments, part or all of baseband processing circuitry 1324 and application processing circuitry 1326 may be combined into one chip or set of chips, and RF transceiver circuitry 1322 may be on a separate chip or set of chips. In still alternative embodiments, part or all of RF transceiver circuitry 1322 and baseband processing circuitry 1324 may be on the same chip or set of chips, and application processing circuitry 1326 may be on a separate chip or set of chips. In yet other alternative embodiments, part or all of RF transceiver circuitry 1322, baseband processing circuitry 1324, and application processing circuitry 1326 may be combined in the same chip or set of chips. In some embodiments, RF transceiver circuitry 1322 may be a part of interface 1314. RF transceiver circuitry 1322 may condition RF signals for processing circuitry 1320.

In certain embodiments, some or all of the functionality described herein as being performed by a WD may be provided by processing circuitry 1320 executing instructions stored on device readable medium 1330, which in certain embodiments may be a computer-readable storage medium. In alternative embodiments, some or all of the functionality may be provided by processing circuitry 1320 without executing instructions stored on a separate or discrete device readable storage medium, such as in a hard-wired manner. In any of those particular embodiments, whether executing instructions stored on a device readable storage medium or not, processing circuitry 1320 can be configured to perform the described functionality. The benefits provided by such functionality are not limited to processing circuitry 1320 alone or to other components of WD 1310, but are enjoyed by WD 1310 as a whole, and/or by end users and the wireless network generally.

Processing circuitry 1320 may be configured to perform any determining, calculating, or similar operations (e.g., certain obtaining operations) described herein as being performed by a WD. These operations, as performed by processing circuitry 1320, may include processing information obtained by processing circuitry 1320 by, for example, converting the obtained information into other information, comparing the obtained information or converted information to information stored by WD 1310, and/or performing one or more operations based on the obtained information or converted information, and as a result of said processing making a determination.

Device readable medium 1330 may be operable to store a computer program, software, an application including one or more of logic, rules, code, tables, etc. and/or other instructions capable of being executed by processing circuitry 1320. Device readable medium 1330 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1320. In some embodiments, processing circuitry 1320 and device readable medium 1330 may be considered to be integrated.

User interface equipment 1332 may provide components that allow for a human user to interact with WD 1310. Such interaction may be of many forms, such as visual, audial, tactile, etc. User interface equipment 1332 may be operable to produce output to the user and to allow the user to provide input to WD 1310. The type of interaction may vary depending on the type of user interface equipment 1332 installed in WD 1310. For example, if WD 1310 is a smart phone, the interaction may be via a touch screen; if WD 1310 is a smart meter, the interaction may be through a screen that provides usage (e.g., the number of gallons used) or a speaker that provides an audible alert (e.g., if smoke is detected). User interface equipment 1332 may include input interfaces, devices and circuits, and output interfaces, devices and circuits. User interface equipment 1332 is configured to allow input of information into WD 1310, and is connected to processing circuitry 1320 to allow processing circuitry 1320 to process the input information. User interface equipment 1332 may include, for example, a microphone, a proximity or other sensor, keys/buttons, a touch display, one or more cameras, a USB port, or other input circuitry. User interface equipment 1332 is also configured to allow output of information from WD 1310, and to allow processing circuitry 1320 to output information from WD 1310. User interface equipment 1332 may include, for example, a speaker, a display, vibrating circuitry, a USB port, a headphone interface, or other output circuitry. Using one or more input and output interfaces, devices, and circuits, of user interface equipment 1332, WD 1310 may communicate with end users and/or the wireless network, and allow them to benefit from the functionality described herein.

Auxiliary equipment 1334 is operable to provide more specific functionality which may not be generally performed by WDs. This may comprise specialized sensors for doing measurements for various purposes, interfaces for additional types of communication such as wired communications etc. The inclusion and type of components of auxiliary equipment 1334 may vary depending on the embodiment and/or scenario.

Power source 1336 may, in some embodiments, be in the form of a battery or battery pack. Other types of power sources, such as an external power source (e.g., an electricity outlet), photovoltaic devices or power cells, may also be used. WD 1310 may further comprise power circuitry 1337 for delivering power from power source 1336 to the various parts of WD 1310 which need power from power source 1336 to carry out any functionality described or indicated herein. Power circuitry 1337 may in certain embodiments comprise power management circuitry. Power circuitry 1337 may additionally or alternatively be operable to receive power from an external power source; in which case WD 1310 may be connectable to the external power source (such as an electricity outlet) via input circuitry or an interface such as an electrical power cable. Power circuitry 1337 may also in certain embodiments be operable to deliver power from an external power source to power source 1336. This may be, for example, for the charging of power source 1336. Power circuitry 1337 may perform any formatting, converting, or other modification to the power from power source 1336 to make the power suitable for the respective components of WD 1310 to which power is supplied.

Figure 14:
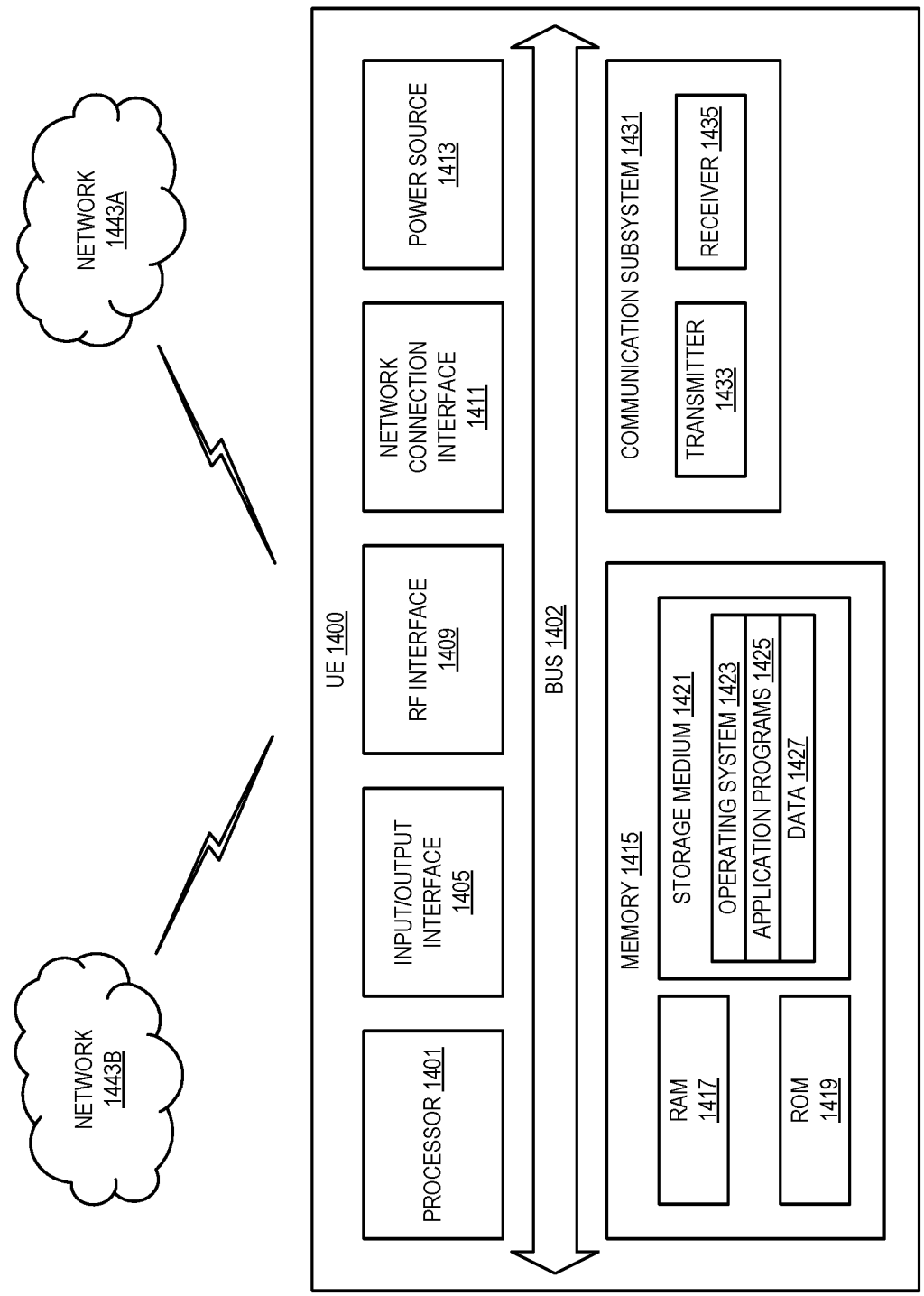
FIG. 14 illustrates a UE in accordance with some embodiments.

FIG. 14 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 14200 may be any UE identified by the $3^{rd}$ Generation Partnership Project (3GPP), including a NB-IoT UE, a machine type communication (MTC) UE, and/or an enhanced MTC (eMTC) UE. UE 1400, as illustrated in FIG. 14, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 14 is a UE, the components discussed herein are equally applicable to a WD, and vice-versa.

In FIG. 14, UE 1400 includes processing circuitry 1401 that is operatively coupled to input/output interface 1405, radio frequency (RF) interface 1409, network connection interface 1411, memory 1415 including random access memory (RAM) 1417, read-only memory (ROM) 1419, and storage medium 1421 or the like, communication subsystem 1431, power source 1433, and/or any other component, or any combination thereof. Storage medium 1421 includes operating system 1423, application program 1425, and data 1427. In other embodiments, storage medium 1421 may include other similar types of information. Certain UEs may utilize all of the components shown in FIG. 14, or only a subset of the components. The level of integration between the components may vary from one UE to another UE. Further, certain UEs may contain multiple instances of a component, such as multiple processors, memories, transceivers, transmitters, receivers, etc.

In FIG. 14, processing circuitry 1401 may be configured to process computer instructions and data. Processing circuitry 1401 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1401 may include two central processing units (CPUs). Data may be information in a form suitable for use by a computer.

In the depicted embodiment, input/output interface 1405 may be configured to provide a communication interface to an input device, output device, or input and output device. UE 1400 may be configured to use an output device via input/output interface 1405. An output device may use the same type of interface port as an input device. For example, a USB port may be used to provide input to and output from UE 1400. The output device may be a speaker, a sound card, a video card, a display, a monitor, a printer, an actuator, an emitter, a smartcard, another output device, or any combination thereof. UE 1400 may be configured to use an input device via input/output interface 1405 to allow a user to capture information into UE 1400. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 14, RF interface 1409 may be configured to provide a communication interface to RF components such as a transmitter, a receiver, and an antenna. Network connection interface 1411 may be configured to provide a communication interface to network 1443a. Network 1443a may encompass wired and/or wireless networks such as a local-area network (LAN), a wide-area network (WAN), a computer network, a wireless network, a telecommunications network, another like network or any combination thereof. For example, network 1443a may comprise a Wi-Fi network. Network connection interface 1411 may be configured to include a receiver and a transmitter interface used to communicate with one or more other devices over a communication network according to one or more communication protocols, such as Ethernet, TCP/IP, SONET, ATM, or the like. Network connection interface 1411 may implement receiver and transmitter functionality appropriate to the communication network links (e.g., optical, electrical, and the like). The transmitter and receiver functions may share circuit components, software or firmware, or alternatively may be implemented separately.

RAM 1417 may be configured to interface via bus 1402 to processing circuitry 1401 to provide storage or caching of data or computer instructions during the execution of software programs such as the operating system, application programs, and device drivers. ROM 1419 may be configured to provide computer instructions or data to processing circuitry 1401. For example, ROM 1419 may be configured to store invariant low-level system code or data for basic system functions such as basic input and output (I/O), startup, or reception of keystrokes from a keyboard that are stored in a non-volatile memory. Storage medium 1421 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1421 may be configured to include operating system 1423, application program 1425 such as a web browser application, a widget or gadget engine or another application, and data file 1427. Storage medium 1421 may store, for use by UE 1400, any of a variety of various operating systems or combinations of operating systems.

Storage medium 1421 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1421 may allow UE 1400 to access computer-executable instructions, application programs or the like, stored on transitory or non-transitory memory media, to off-load data, or to upload data. An article of manufacture, such as one utilizing a communication system may be tangibly embodied in storage medium 1421, which may comprise a device readable medium.

In FIG. 14, processing circuitry 1401 may be configured to communicate with network 1443*b* using communication subsystem 1431. Network 1443*a* and network 1443*b* may be the same network or networks or different network or networks. Communication subsystem 1431 may be configured to include one or more transceivers used to communicate with network 1443*b*. For example, communication subsystem 1431 may be configured to include one or more transceivers used to communicate with one or more remote transceivers of another device capable of wireless communication such as another WD, UE, or base station of a radio access network (RAN) according to one or more communication protocols, such as IEEE 802.14, CDMA, WCDMA, GSM, LTE, UTRAN, WiMax, or the like. Each transceiver may include transmitter 1433 and/or receiver 1435 to implement transmitter or receiver functionality, respectively, appropriate to the RAN links (e.g., frequency allocations and the like). Further, transmitter 1433 and receiver 1435 of each transceiver may share circuit components, software or firmware, or alternatively may be implemented separately.

In the illustrated embodiment, the communication functions of communication subsystem 1431 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1431 may include cellular communication, Wi-Fi communication, Bluetooth communication, and GPS communication. Network 1443*b* may encompass wired and/or wireless networks such as a local-area network (LAN), a wide-area network (WAN), a computer network, a wireless network, a telecommunications network, another like network or any combination thereof. For example, network 1443*b* may be a cellular network, a Wi-Fi network, and/or a near-field network. Power source 1413 may be configured to provide alternating current (AC) or direct current (DC) power to components of UE 1400.

The features, benefits and/or functions described herein may be implemented in one of the components of UE 1400 or partitioned across multiple components of UE 1400. Further, the features, benefits, and/or functions described herein may be implemented in any combination of hardware, software or firmware. In one example, communication subsystem 1431 may be configured to include any of the components described herein. Further, processing circuitry 1401 may be configured to communicate with any of such components over bus 1402. In another example, any of such components may be represented by program instructions stored in memory that when executed by processing circuitry 1401 perform the corresponding functions described herein. In another example, the functionality of any of such components may be partitioned between processing circuitry 1401 and communication subsystem 1431. In another example, the non-computationally intensive functions of any of such components may be implemented in software or firmware and the computationally intensive functions may be implemented in hardware.

Figure 15:
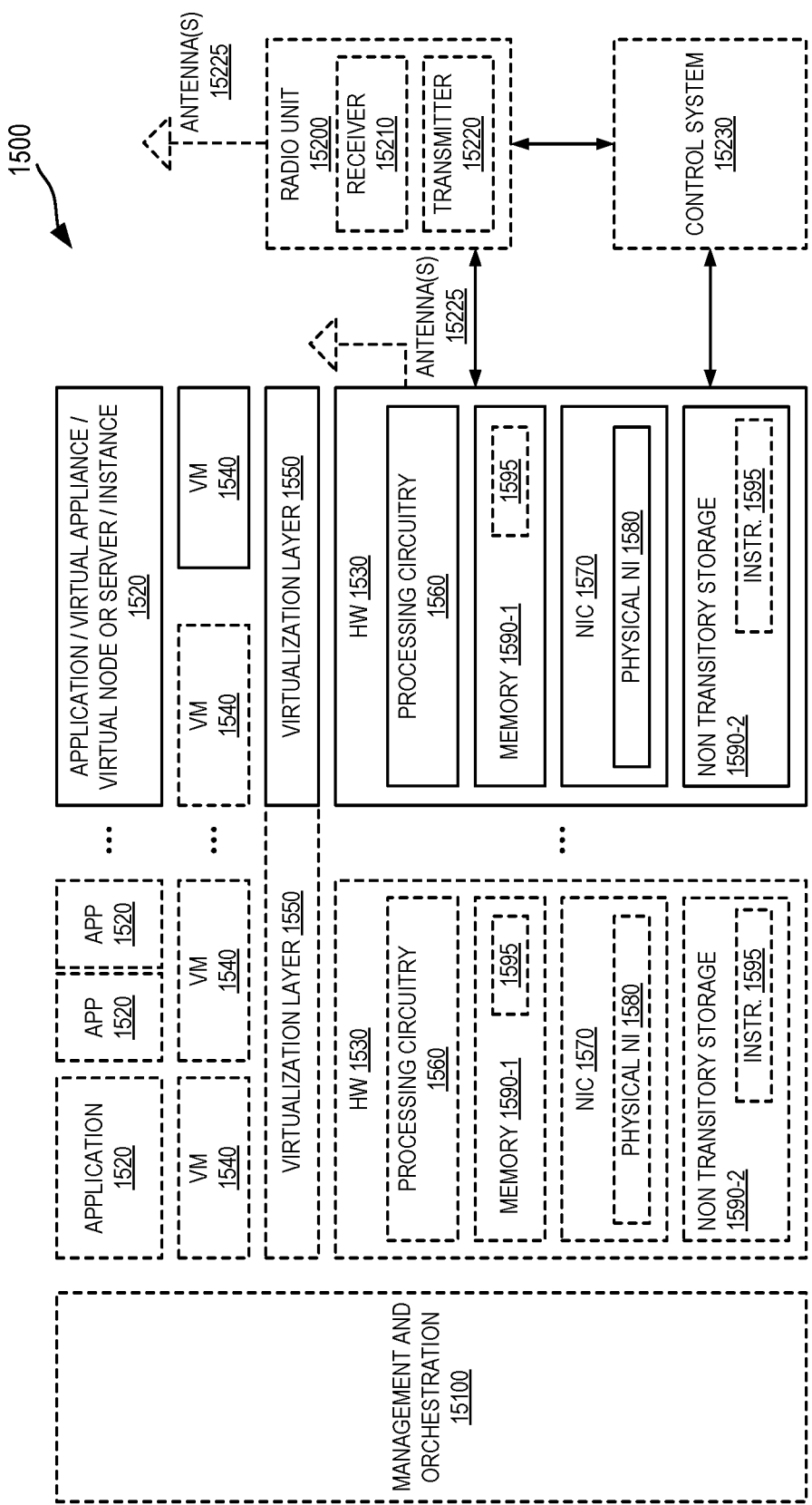
FIG. 15 illustrates a virtualization environment in accordance with some embodiments.

FIG. 15 is a schematic block diagram illustrating a virtualization environment 1500 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1500 hosted by one or more of hardware nodes 1530. Further, in embodiments in which the virtual node is not a radio access node or does not require radio connectivity (e.g., a core network node), then the network node may be entirely virtualized.

The functions may be implemented by one or more applications 1520 (which may alternatively be called software instances, virtual appliances, network functions, virtual nodes, virtual network functions, etc.) operative to implement some of the features, functions, and/or benefits of some of the embodiments disclosed herein. Applications 1520 are run in virtualization environment 1500 which provides hardware 1530 comprising processing circuitry 1560 and memory 1590. Memory 1590 contains instructions 1595 executable by processing circuitry 1560 whereby application 1520 is operative to provide one or more of the features, benefits, and/or functions disclosed herein.

Virtualization environment 1500, comprises general-purpose or special-purpose network hardware devices 1530 comprising a set of one or more processors or processing circuitry 1560, which may be commercial off-the-shelf (COTS) processors, dedicated Application Specific Integrated Circuits (ASICs), or any other type of processing circuitry including digital or analog hardware components or special purpose processors. Each hardware device may comprise memory 1590-1 which may be non-persistent memory for temporarily storing instructions 1595 or software executed by processing circuitry 1560. Each hardware device may comprise one or more network interface controllers (NICs) 1570, also known as network interface cards, which include physical network interface 1580. Each hardware device may also include non-transitory, persistent, machine-readable storage media 1590-2 having stored therein software 1595 and/or instructions executable by processing circuitry 1560. Software 1595 may include any type of software including software for instantiating one or more virtualization layers 1550 (also referred to as hypervisors), software to execute virtual machines 1540 as well as software allowing it to execute functions, features and/or benefits described in relation with some embodiments described herein.

Virtual machines 1540, comprise virtual processing, virtual memory, virtual networking or interface and virtual storage, and may be run by a corresponding virtualization layer 1550 or hypervisor. Different embodiments of the instance of virtual appliance 1520 may be implemented on one or more of virtual machines 1540, and the implementations may be made in different ways.

During operation, processing circuitry 1560 executes software 1595 to instantiate the hypervisor or virtualization layer 1550, which may sometimes be referred to as a virtual machine monitor (VMM). Virtualization layer 1550 may present a virtual operating platform that appears like networking hardware to virtual machine 1540.

As shown in FIG. 15, hardware 1530 may be a standalone network node with generic or specific components. Hardware 1530 may comprise antenna 15225 and may implement some functions via virtualization. Alternatively, hardware 1530 may be part of a larger cluster of hardware (e.g. such as in a data center or customer premise equipment (CPE)) where many hardware nodes work together and are managed via management and orchestration (MANO) 15100, which, among others, oversees lifecycle management of applications 1520.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1540 may be a software implementation of a physical machine that runs programs as if they were executing on a physical, non-virtualized machine. Each of virtual machines 1540, and that part of hardware 1530 that executes that virtual machine, be it hardware dedicated to that virtual machine and/or hardware shared by that virtual machine with others of the virtual machines 1540, forms a separate virtual network elements (VNE).

Still in the context of NFV, Virtual Network Function (VNF) is responsible for handling specific network functions that run in one or more virtual machines 1540 on top of hardware networking infrastructure 1530 and corresponds to application 1520 in FIG. 15.

In some embodiments, one or more radio units 15200 that each include one or more transmitters 15220 and one or more receivers 15210 may be coupled to one or more antennas 15225. Radio units 15200 may communicate directly with hardware nodes 1530 via one or more appropriate network interfaces and may be used in combination with the virtual components to provide a virtual node with radio capabilities, such as a radio access node or a base station.

In some embodiments, some signalling can be effected with the use of control system 15230 which may alternatively be used for communication between the hardware nodes 1530 and radio units 15200.

Figure 16:
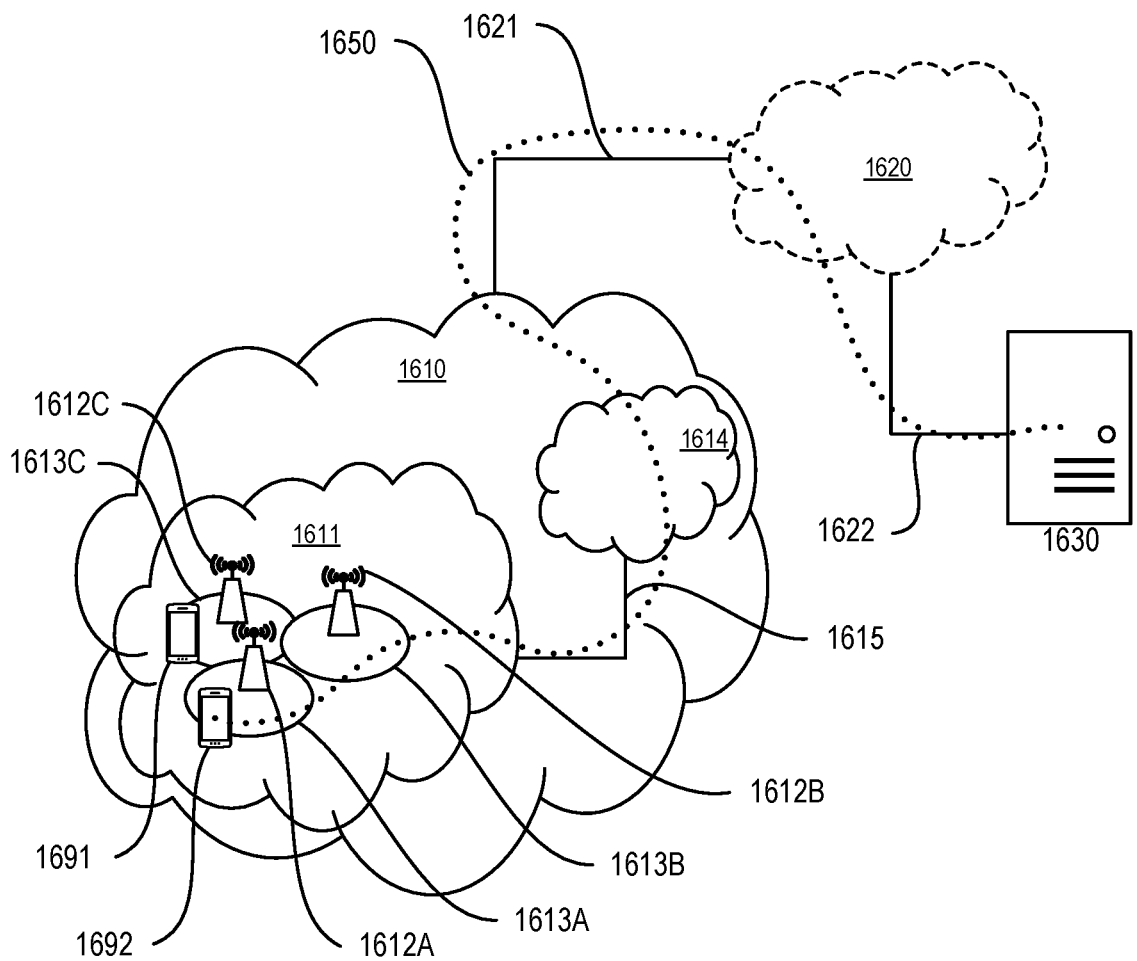
FIG. 16 illustrates a telecommunication network connected via an intermediate network to a host computer in accordance with some embodiments.

With reference to FIG. 16, in accordance with an embodiment, a communication system includes telecommunication network 1610, such as a 3GPP-type cellular network, which comprises access network 1611, such as a radio access network, and core network 1614. Access network 1611 comprises a plurality of base stations 1612*a*, 1612*b*, 1612*c*, such as NBs, eNBs, gNBs or other types of wireless access points, each defining a corresponding coverage area 1613*a*, 1613*b*, 1613*c*. Each base station 1612*a*, 1612*b*, 1612*c* is connectable to core network 1614 over a wired or wireless connection 1615. A first UE 1691 located in coverage area 1613*c* is configured to wirelessly connect to, or be paged by, the corresponding base station 1612*c*. A second UE 1692 in coverage area 1613*a* is wirelessly connectable to the corresponding base station 1612*a*. While a plurality of UEs 1691, 1692 are illustrated in this example, the disclosed embodiments are equally applicable to a situation where a sole UE is in the coverage area or where a sole UE is connecting to the corresponding base station 1612.

Telecommunication network 1610 is itself connected to host computer 1630, which may be embodied in the hardware and/or software of a standalone server, a cloud-implemented server, a distributed server or as processing resources in a server farm. Host computer 1630 may be under the ownership or control of a service provider, or may be operated by the service provider or on behalf of the service provider. Connections 1621 and 1622 between telecommunication network 1610 and host computer 1630 may extend directly from core network 1614 to host computer 1630 or may go via an optional intermediate network 1620. Intermediate network 1620 may be one of, or a combination of more than one of, a public, private or hosted network; intermediate network 1620, if any, may be a backbone network or the Internet; in particular, intermediate network 1620 may comprise two or more sub-networks (not shown).

The communication system of FIG. 16 as a whole enables connectivity between the connected UEs 1691, 1692 and host computer 1630. The connectivity may be described as an over-the-top (OTT) connection 1650. Host computer 1630 and the connected UEs 1691, 1692 are configured to communicate data and/or signaling via OTT connection 1650, using access network 1611, core network 1614, any intermediate network 1620 and possible further infrastructure (not shown) as intermediaries. OTT connection 1650 may be transparent in the sense that the participating communication devices through which OTT connection 1650 passes are unaware of routing of uplink and downlink communications. For example, base station 1612 may not or need not be informed about the past routing of an incoming downlink communication with data originating from host computer 1630 to be forwarded (e.g., handed over) to a connected UE 1691. Similarly, base station 1612 need not be aware of the future routing of an outgoing uplink communication originating from the UE 1691 towards the host computer 1630.

Example implementations, in accordance with an embodiment, of the UE, base station and host computer discussed in the preceding paragraphs will now be described with reference to FIG. 17. In communication system 1700, host computer 1710 comprises hardware 1715 including communication interface 1716 configured to set up and maintain a wired or wireless connection with an interface of a different communication device of communication system 1700. Host computer 1710 further comprises processing circuitry 1718, which may have storage and/or processing capabilities. In particular, processing circuitry 1718 may comprise one or more programmable processors, application-specific integrated circuits, field programmable gate arrays or combinations of these (not shown) adapted to execute instructions. Host computer 1710 further comprises software 1711, which is stored in or accessible by host computer 1710 and executable by processing circuitry 1718. Software 1711 includes host application 1712. Host application 1712 may be operable to provide a service to a remote user, such as UE 1730 connecting via OTT connection 1750 terminating at UE 1730 and host computer 1710. In providing the service to the remote user, host application 1712 may provide user data which is transmitted using OTT connection 1750.

Communication system 1700 further includes base station 1720 provided in a telecommunication system and comprising hardware 1725 enabling it to communicate with host computer 1710 and with UE 1730. Hardware 1725 may include communication interface 1726 for setting up and maintaining a wired or wireless connection with an interface of a different communication device of communication system 1700, as well as radio interface 1727 for setting up and maintaining at least wireless connection 1770 with UE 1730 located in a coverage area (not shown in FIG. 17) served by base station 1720. Communication interface 1726 may be configured to facilitate connection 1760 to host computer 1710. Connection 1760 may be direct or it may pass through a core network (not shown in FIG. 17) of the telecommunication system and/or through one or more intermediate networks outside the telecommunication system. In the embodiment shown, hardware 1725 of base station 1720 further includes processing circuitry 1728, which may comprise one or more programmable processors, application-specific integrated circuits, field programmable gate arrays or combinations of these (not shown) adapted to execute instructions. Base station 1720 further has software 1721 stored internally or accessible via an external connection.

Communication system 1700 further includes UE 1730 already referred to. The hardware 1735 may include radio interface 1737 configured to set up and maintain wireless connection 1770 with a base station serving a coverage area in which UE 1730 is currently located. Hardware 1735 of UE 1730 further includes processing circuitry 1738, which may comprise one or more programmable processors, application-specific integrated circuits, field programmable gate arrays or combinations of these (not shown) adapted to execute instructions. UE 1730 further comprises software 1731, which is stored in or accessible by UE 1730 and executable by processing circuitry 1738. Software 1731 includes client application 1732. Client application 1732 may be operable to provide a service to a human or non-human user via UE 1730, with the support of host computer 1710. In host computer 1710, an executing host application 1712 may communicate with the executing client application 1732 via OTT connection 1750 terminating at UE 1730 and host computer 1710. In providing the service to the user, client application 1732 may receive request data from host application 1712 and provide user data in response to the request data. OTT connection 1750 may transfer both the request data and the user data. Client application 1732 may interact with the user to generate the user data that it provides.

Figure 17:
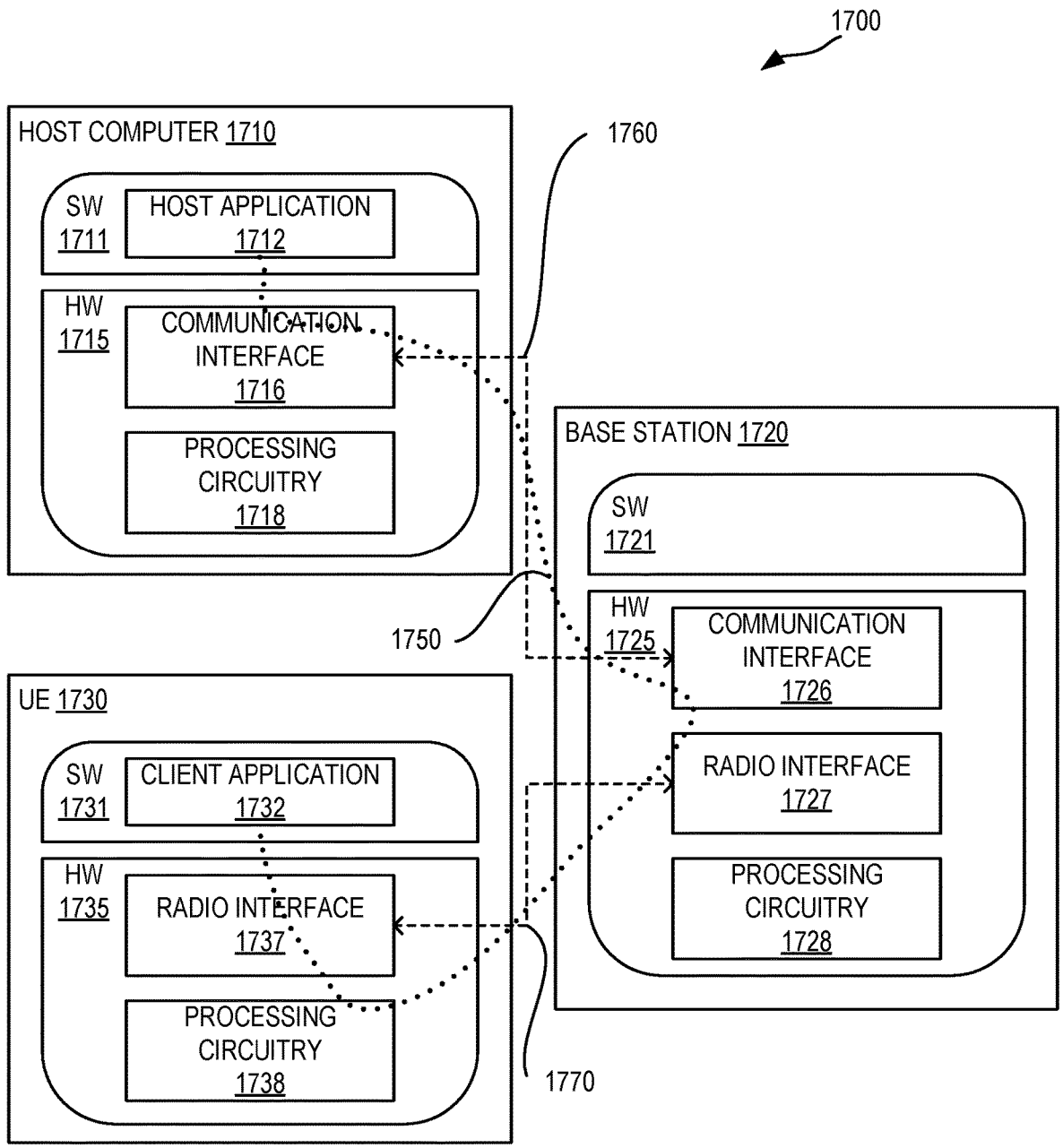
FIG. 17 illustrates a host computer communicating via a base station with a user equipment over a partially wireless connection in accordance with some embodiments.

It is noted that host computer 1710, base station 1720 and UE 1730 illustrated in FIG. 17 may be similar or identical to host computer 1630, one of base stations 1612*a*, 1612*b*, 1612*c* and one of UEs 1691, 1692 of FIG. 16, respectively. This is to say, the inner workings of these entities may be as shown in FIG. 17 and independently, the surrounding network topology may be that of FIG. 16.

In FIG. 17, OTT connection 1750 has been drawn abstractly to illustrate the communication between host computer 1710 and UE 1730 via base station 1720, without explicit reference to any intermediary devices and the precise routing of messages via these devices. Network infrastructure may determine the routing, which it may be configured to hide from UE 1730 or from the service provider operating host computer 1710, or both. While OTT connection 1750 is active, the network infrastructure may further take decisions by which it dynamically changes the routing (e.g., on the basis of load balancing consideration or reconfiguration of the network).

Wireless connection 1770 between UE 1730 and base station 1720 is in accordance with the teachings of the embodiments described throughout this disclosure. One or more of the various embodiments improve the performance of OTT services provided to UE 1730 using OTT connection 1750, in which wireless connection 1770 forms the last segment. More precisely, the teachings of these embodiments may improve the latency and can improve the average throughput of a communications system. Radio resource efficiency could be positively impacted by latency reductions. Lower packet data latency could increase the number of transmissions possible within a certain delay bound; hence higher Block Error Rate (BLER) targets could be used for the data transmissions freeing up radio resources potentially improving the capacity of the system.

A measurement procedure may be provided for the purpose of monitoring data rate, latency and other factors on which the one or more embodiments improve. There may further be an optional network functionality for reconfiguring OTT connection 1750 between host computer 1710 and UE 1730, in response to variations in the measurement results. The measurement procedure and/or the network functionality for reconfiguring OTT connection 1750 may be implemented in software 1711 and hardware 1715 of host computer 1710 or in software 1731 and hardware 1735 of UE 1730, or both. In embodiments, sensors (not shown) may be deployed in or in association with communication devices through which OTT connection 1750 passes; the sensors may participate in the measurement procedure by supplying values of the monitored quantities exemplified above, or supplying values of other physical quantities from which software 1711, 1731 may compute or estimate the monitored quantities. The reconfiguring of OTT connection 1750 may include message format, retransmission settings, preferred routing etc.; the reconfiguring need not affect base station 1720, and it may be unknown or imperceptible to base station 1720. Such procedures and functionalities may be known and practiced in the art. In certain embodiments, measurements may involve proprietary UE signaling facilitating host computer 1710's measurements of throughput, propagation times, latency and the like. The measurements may be implemented in that software 1711 and 1731 causes messages to be transmitted, in particular empty or 'dummy' messages, using OTT connection 1750 while it monitors propagation times, errors etc.

FIG. 18 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 18 will be included in this section. In step 1810, the host computer provides user data. In substep 1811 (which may be optional) of step 1810, the host computer provides the user data by executing a host application. In step 1820, the host computer initiates a transmission carrying the user data to the UE. In step 1830 (which may be optional), the base station transmits to the UE the user data which was carried in the transmission that the host computer initiated, in accordance with the teachings of the embodiments described throughout this disclosure. In step 1840 (which may also be optional), the UE executes a client application associated with the host application executed by the host computer.

FIG. 19 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 19 will be included in this section. In step 1910 of the method, the host computer provides user data. In an optional substep (not shown) the host computer provides the user data by executing a host application. In step 1920, the host computer initiates a transmission carrying the user data to the UE. The transmission may pass via the base station, in accordance with the teachings of the embodiments described throughout this disclosure. In step 1930 (which may be optional), the UE receives the user data carried in the transmission.

FIG. 20 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 20 will be included in this section. In step 2010 (which may be optional), the UE receives input data provided by the host computer. Additionally or alternatively, in step 2020, the UE provides user data. In substep 2021 (which may be optional) of step 2020, the UE provides the user data by executing a client application. In substep 2011 (which may be optional) of step 2010, the UE executes a client application which provides the user data in reaction to the received input data provided by the host computer. In providing the user data, the executed client application may further consider user input received from the user. Regardless of the specific manner in which the user data was provided, the UE initiates, in substep 2030 (which may be optional), transmission of the user data to the host computer. In step 2040 of the method, the host computer receives the user data transmitted from the UE, in accordance with the teachings of the embodiments described throughout this disclosure.

FIG. 21 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 21 will be included in this section. In step 2110 (which may be optional), in accordance with the teachings of the embodiments described throughout this disclosure, the base station receives user data from the UE. In step 2120 (which may be optional), the base station initiates transmission of the received user data to the host computer. In step 2130 (which may be optional), the host computer receives the user data carried in the transmission initiated by the base station.

Figure 22:
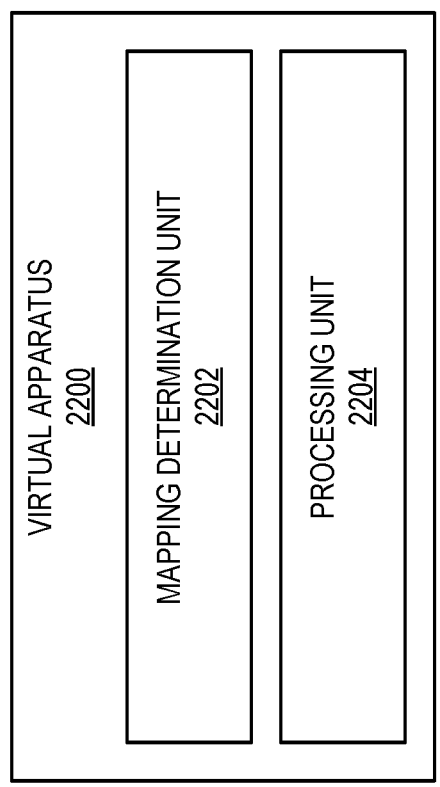
FIG. 22 illustrates a virtualization apparatus in accordance with some embodiments.

FIG. 22 illustrates a schematic block diagram of an apparatus 2200 in a wireless network (for example, the wireless network shown in FIG. 13). The apparatus may be implemented in a wireless device or network node (e.g., wireless device 1310 or network node 1360 shown in FIG. 13). Apparatus 2200 is operable to carry out the example method described with reference to FIGS. 11 and/or 12. At least some operations of the method can be performed by one or more other entities.

Virtual Apparatus 2200 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause mapping determination unit 2202, processing unit 2204, and any other suitable units of apparatus 2200 to perform corresponding functions according one or more embodiments of the present disclosure.

As illustrated in FIG. 22, apparatus 2200 includes mapping determination unit 2202 and processing unit 2204. Mapping determination unit 2202 is configured to determine a mapping between one or more SCCE and corresponding SREG for a communication from the base station to the UE. Processing unit 2204 is configured to process the communication from the base station based on the mapping between one or more SCCE and corresponding SREG for the communication from the base station.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Numbered Embodiments

While not being limited thereto, some example embodiments of the present disclosure are provided below.

1. A method implemented in a User Equipment (UE), comprising:

receiving a communication from a base station;

determining a mapping between one or more short Control Channel Elements (SCCE) and corresponding short Resource Element Groups (SREG) for the communication from the base station; and processing the communication from the base station based on the mapping between one or more SCCE and corresponding SREG for the communication from the base station.

2. The method of embodiment 1 wherein determining the mapping between the one or more SCCE and the corresponding SREG comprises determining the mapping between the one or more SCCE and the corresponding SREG based on a demodulation scheme used for the communication from the base station.

3. The method of embodiment 2 wherein determining the mapping between the one or more SCCE and the corresponding SREG comprises:
  determining that the demodulation scheme used for the communication from the base station is CRS; and
  in response, determining the mapping between the one or more SCCE and the corresponding SREG to achieve high frequency diversity.

4. The method of embodiment 3 wherein determining the mapping between the one or more SCCE and the corresponding SREG to achieve high frequency diversity comprises determining the SREG corresponding to an SCCE as selected in a distributed manner along the SPDCCH RB set as well as only from 1 OFDM symbol.

5. The method of embodiment 3 wherein determining the mapping between the one or more SCCE and the corresponding SREG to achieve high frequency diversity comprises:
  for the distributed SCCE to SREG mapping in 1os CRS-based SPDCCH, the SREGs corresponding to an SCCE index k are given by the following definition:

$$k + i * \left\lfloor \frac{N_{sREG_{tot}}}{N_{sREG/sCCE}} \right\rfloor$$

where k=0, ..., $N_{sCCE}-1$, $N_{sCCE}$ is the number of SCCE in the SPDCCH RB set, i=0, ..., $N_{sREG/sCCE}-1$, $N_{sREG_{tot}}$ is the total number of SREGs in the SPDCCH RB set, and $N_{sREG/sCCE}$ is the number of SREG per SCCE.

6. The method of embodiment 3 wherein determining the mapping between the one or more SCCE and the corresponding SREG to achieve high frequency diversity comprises:
  for the SREG based distributed mapping in 2os CRS-based SPDCCH, the SREGs corresponding to an SCCE index k are given by the following definition:

$$k \bmod N_{sCCE/OS} + \left\lfloor \frac{k}{N_{sCCE/OS}} \right\rfloor * N_{\frac{sREG}{OS}} + i * N_{sCCE/OS}$$

where k, ..., $N_{sCCE}-1$, $N_{sCCE}$ is the number of SCCE in the SPDCCH RB set, =i0, ..., $N_{sREG/sCCE}-1$, $N_{sCCE/OS}$ is the number of SCCEs per OFDM symbol within the SPDCCH RB set, i.e. $N_{sCCE/OS} = \left\lfloor \frac{N_{sREG/OS}}{N_{sREG/sCCE}} \right\rfloor$.

$N_{sREG/OS}$ is the number of SREGs per OFDM symbol and $N_{sREG/sCCE}$ is the number of SREG per SCCE, i.e. 4 SREG/SCCE for CRS-based SPDCCH.

7. The method of embodiment 3 wherein determining the mapping between the one or more SCCE and the corresponding SREG to achieve high frequency diversity comprises:
  for the SREG based localized mapping within 1os and 2os CRS-based SPDCCH, the SREGs corresponding to an SCCE index k are given by the following definition:

$$k * N_{sREG/sCCE} + i$$

where k=0, ..., $N_{sCCE}-1$, $N_{sCCE}$ is the number of SCCE in the SPDCCH RB set, i=0, ..., $N_{sREG/sCCE}-1$, and $N_{sREG/sCCE}$ is the number of SREG per SCCE, i.e. 4 SREG/SCCE for CRS-based SPDCCH.

8. The method of embodiment 2 wherein determining the mapping between the one or more SCCE and the corresponding SREG comprises:
  determining that the demodulation scheme used for the communication from the base station is DMRS; and
  in response, determining the mapping between the one or more SCCE and the corresponding SREG based on that fact.

9. The method of embodiment 8 wherein determining the mapping between the one or more SCCE and the corresponding SREG comprises:
  for the SCCE to SREG mapping in 2os and 3os DMRS-based SPDCCH, the SREGs corresponding to an SCCE index k are given by the following definition:

$$k * N_{sREG/sCCE} + i$$

where k=0, ..., $N_{sCCE}-1$, $N_{sCCE}$ is the number of SCCE in the SPDCCH RB set, i=0, ..., $N_{sREG/sCCE}-1$ and $N_{sREG/sCCE}$ is the number of SREG per SCCE, i.e. 4 SREG/SCCE for 2os DMRS-based SPDCCH and 6 SREG/SCCE for 3os DMRS-based SPDCCH.

10. The method of any of the previous embodiments further comprising:
  for an aggregation level higher than one, the SCCEs corresponding to a distributed DMRS-based SPDCCH candidate m within the UE's SPDCCH RB set is defined as follows:

$$Y_{p,k}^L + m + i * \frac{N_{sCCE}}{L}$$

where $Y_{p,k}^L$ is a UE's SCCE starting offset configured by higher layer signaling, i=0, ..., L−1. L is the aggregation level and is higher than one, $N_{sCCE}$ is the total number of SCCEs in the SPDCCH RB set, and m=0, ..., $M^L-1$. $M^L$ is the number of SPDCCH candidates per aggregation level L.

11. The method of any of the previous embodiments wherein receiving the communication from the base station comprises receiving the communication from the base station on a short Physical Downlink Control Channel (SPDCCH).

12. A User Equipment (UE) configured to communicate with a base station, the UE comprising a radio interface and processing circuitry configured to:
  receive a communication from a base station;
  determine a mapping between one or more short Control Channel Elements (SCCE) and corresponding short Resource Element Groups (SREG) for the communication from the base station; and
  process the communication from the base station based on the mapping between one or more SCCE and corresponding SREG for the communication from the base station.

13. The UE of embodiment 12 wherein determining the mapping between the one or more SCCE and the corresponding SREG comprises determining the mapping between the one or more SCCE and the corresponding SREG based on a demodulation scheme used for the communication from the base station.

14. The UE of embodiment 13 wherein determining the mapping between the one or more SCCE and the corresponding SREG comprises the UE further configured to:

determine that the demodulation scheme used for the communication from the base station is CRS; and in response, determine the mapping between the one or more SCCE and the corresponding SREG to achieve high frequency diversity.

15. The UE of embodiment 14 wherein determining the mapping between the one or more SCCE and the corresponding SREG to achieve high frequency diversity comprises determining the SREG corresponding to an SCCE as selected in a distributed manner along the SPDCCH RB set as well as only from 1 OFDM symbol.

16. The UE of embodiment 14 wherein determining the mapping between the one or more SCCE and the corresponding SREG to achieve high frequency diversity comprises the UE further configured to:

for the distributed SCCE to SREG, map in 1os CRS-based SPDCCH, the SREGs corresponding to an SCCE index k are given by the following definition:

$$k + i * \left\lfloor \frac{N_{sREG_{tot}}}{N_{sREG/sCCE}} \right\rfloor$$

where k=0, . . . , $N_{sCCE}-1$, $N_{sCCE}$ is the number of SCCE in the SPDCCH RB set, i=0, . . . , $N_{sREG/sCCE}-1$, $N_{sREG_{tot}}$ is the total number of SREGs in the SPDCCH RB set, and $N_{sREG/sCCE}$ is the number of SREG per SCCE.

17. The UE of embodiment 14 wherein determining the mapping between the one or more SCCE and the corresponding SREG to achieve high frequency diversity comprises the UE further configured to:

for the SREG based distributed mapping in 2os CRS-based SPDCCH, the SREGs corresponding to an SCCE index k are given by the following definition:

$$k \bmod N_{sCCE/OS} + \left\lfloor \frac{k}{N_{sCCE/OS}} \right\rfloor * N_{sREG/OS} + i * N_{sCCE/OS}$$

where k=0, . . . , $N_{sCCE}-1$, $N_{sCCE}$ is the number of SCCE in the SPDCCH RB set, i=0, . . . , $N_{sREG/sCCE}-1$, $N_{sCCE/OS}$ is the number of SCCEs per OFDM symbol within the SPDCCH RB set, i.e.

$$N_{sCCE/OS} = \left\lfloor \frac{N_{sREG/OS}}{N_{sREG/sCCE}} \right\rfloor.$$

$N_{sREG/OS}$ is the number of SREGs per OFDM symbol and $N_{sREG/sCCE}$ is the number of SREG per SCCE, i.e. 4 SREG/SCCE for CRS-based SPDCCH.

18. The UE of embodiment 14 wherein determining the mapping between the one or more SCCE and the corresponding SREG to achieve high frequency diversity comprises the UE further configured to:

for the SREG based localized mapping within 1os and 2os CRS-based SPDCCH, the SREGs corresponding to an SCCE index k are given by the following definition:

$$k * N_{sREG/sCCE} + i$$

where k=0, . . . , $N_{sCCE}-1$, $N_{sCCE}$ is the number of SCCE in the SPDCCH RB set, i=0, . . . , $N_{sREG/sCCE}-1$, and $N_{sREG/sCCE}$ is the number of SREG per SCCE, i.e. 4 SREG/SCCE for CRS-based SPDCCH.

19. The UE of embodiment 13 wherein determining the mapping between the one or more SCCE and the corresponding SREG comprises the UE further configured to:

determine that the demodulation scheme used for the communication from the base station is DMRS; and in response, determine the mapping between the one or more SCCE and the corresponding SREG based on that fact.

20. The UE of embodiment 19 wherein determining the mapping between the one or more SCCE and the corresponding SREG comprises the UE further configured to:

for the SCCE to SREG mapping in 2os and 3os DMRS-based SPDCCH, the SREGs corresponding to an SCCE index k are given by the following definition:

$$k * N_{sREG/sCCE} + i$$

where k=0, . . . , $N_{sCCE}-1$, $N_{sCCE}$ is the number of SCCE in the SPDCCH RB set, i=0, . . . , $N_{sREG/sCCE}-1$ and $N_{sREG/sCCE}$ is the number of SREG per SCCE, i.e. 4 SREG/SCCE for 2os DMRS-based SPDCCH and 6 SREG/SCCE for 3os DMRS-based SPDCCH.

21. The UE of any of the previous embodiments further comprising the UE further configured to:

for an aggregation level higher than one, the SCCEs corresponding to a distributed DMRS-based SPDCCH candidate m within the UE's SPDCCH RB set is defined as follows:

$$Y_{p,k}^L + m + i * \frac{N_{sCCE}}{L}$$

where $Y_{p,k}^L$ is a UE's SCCE starting offset configured by higher layer signaling, i=0, . . . , L−1. L is the aggregation level and is higher than one, $N_{sCCE}$ is the total number of SCCEs in the SPDCCH RB set, and m=0, . . . ,$M^L-1$. $M^L$ is the number of SPDCCH candidates per aggregation level L.

22. The UE of any of the previous embodiments wherein receiving the communication from the base station comprises receiving the communication from the base station on a short Physical Downlink Control Channel (SPDCCH).

23. A method implemented in a base station, comprising:

determining a mapping between one or more short Control Channel Elements (SCCE) and corresponding short Resource Element Groups (SREG) for a communication to a User Equipment (UE); and transmitting a communication to the UE based on the mapping between the one or more SCCE and the corresponding SREG.

24. The method of embodiment 23 wherein determining the mapping between the one or more SCCE and the corresponding SREG comprises determining the mapping between the one or more SCCE and the corresponding SREG based on a demodulation scheme used for the communication from the base station.

25. The method of embodiment 24 wherein determining the mapping between the one or more SCCE and the corresponding SREG comprises:

determining that the demodulation scheme used for the communication from the base station is CRS; and in response, determining the mapping between the one or more SCCE and the corresponding SREG to achieve high frequency diversity.

26. The method of embodiment 25 wherein determining the mapping between the one or more SCCE and the corresponding SREG to achieve high frequency diversity comprises determining the SREG corresponding to an SCCE as selected in a distributed manner along the SPDCCH RB set as well as only from 1 OFDM symbol.

27. The method of embodiment 25 wherein determining the mapping between the one or more SCCE and the corresponding SREG to achieve high frequency diversity comprises:

for the distributed SCCE to SREG mapping in 1os CRS-based SPDCCH, the SREGs corresponding to an SCCE index k are given by the following definition:

$$k + i * \left\lfloor \frac{N_{sREG_{tot}}}{N_{sREG/sCCE}} \right\rfloor$$

where k=0, ..., $N_{sCCE}$−1, $N_{sCCE}$ is the number of SCCE in the SPDCCH RB set, i=0, ..., $N_{sREG/sCCE}$−1, $N_{sREG_{tot}}$ is the total number of SREGs in the SPDCCH RB set, and $N_{sREG/sCCE}$ is the number of SREG per SCCE.

28. The method of embodiment 25 wherein determining the mapping between the one or more SCCE and the corresponding SREG to achieve high frequency diversity comprises:

for the SREG based distributed mapping in 2os CRS-based SPDCCH, the SREGs corresponding to an SCCE index k are given by the following definition:

$$k \bmod N_{sCCE/OS} + \left\lfloor \frac{k}{N_{sCCE/OS}} \right\rfloor * N_{sREG/OS} + i * N_{sCCE/OS}$$

where k=0, ..., $N_{sCCE}$−1, $N_{sCCE}$ is the number of SCCE in the SPDCCH RB set, i=0, ..., $N_{sREG/sCCE}$−1, $N_{sCCE/OS}$ is the number of SCCEs per OFDM symbol within the SPDCCH RB set, i.e. $N_{sCCE/OS} = \left\lfloor \frac{N_{sREG/OS}}{N_{sREG/sCCE}} \right\rfloor$.

$N_{sREG/OS}$ is the number of SREGs per OFDM symbol and $N_{sREG/sCCE}$ is the number of SREG per SCCE, i.e. 4 SREG/SCCE for CRS-based SPDCCH.

29. The method of embodiment 25 wherein determining the mapping between the one or more SCCE and the corresponding SREG to achieve high frequency diversity comprises:

for the SREG based localized mapping within 1os and 2os CRS-based SPDCCH, the SREGs corresponding to an SCCE index k are given by the following definition:

$k*N_{sREG/sCCE}+i$ where k=0, ..., $N_{sCCE}$−1, $N_{sCCE}$ is the number of SCCE in the SPDCCH RB set, i=0, ..., $N_{sREG/sCCE}$−1, and $N_{sREG/sCCE}$ is the number of SREG per SCCE, i.e. 4 SREG/SCCE for CRS-based SPDCCH.

30. The method of embodiment 24 wherein determining the mapping between the one or more SCCE and the corresponding SREG comprises:

determining that the demodulation scheme used for the communication from the base station is DMRS; and in response, determining the mapping between the one or more SCCE and the corresponding SREG based on that fact.

31. The method of embodiment 30 wherein determining the mapping between the one or more SCCE and the corresponding SREG comprises:

for the SCCE to SREG mapping in 2os and 3os DMRS-based SPDCCH, the SREGs corresponding to an SCCE index k are given by the following definition:

$k*N_{sREG/sCCE}+i$ where k=0, ..., $N_{sCCE}$−1, $N_{sCCE}$ is the number of SCCE in the SPDCCH RB set, i=0, ..., $N_{sREG/sCCE}$−1 and $N_{sREG/sCCE}$ is the number of SREG per SCCE, i.e. 4 SREG/SCCE for 2os DMRS-based SPDCCH and 6 SREG/SCCE for 3os DMRS-based SPDCCH.

32. The method of any of the previous embodiments further comprising:

for an aggregation level higher than one, the SCCEs corresponding to a distributed DMRS-based SPDCCH candidate m within the UE's SPDCCH RB set is defined as follows:

$$Y_{p,k}^L + m + i * \frac{N_{sCCE}}{L}$$

where $Y_{p,k}^L$ is a UE's SCCE starting offset configured by higher layer signaling, i=0, ..., L−1. L is the aggregation level and is higher than one, $N_{sCCE}$ is the total number of SCCEs in the SPDCCH RB set, and m=0, ..., $M^L$−1. $M^L$ is the number of SPDCCH candidates per aggregation level L.

33. The method of any of the previous embodiments wherein receiving the communication from the base station comprises receiving the communication from the base station on a short Physical Downlink Control Channel (SPDCCH).

34. A base station configured to communicate with a User Equipment (UE), the base station comprising a radio interface and processing circuitry configured to:

determine a mapping between one or more short Control Channel Elements (SCCE) and corresponding short Resource Element Groups (SREG) for a communication to a User Equipment (UE); and transmit a communication to the UE based on the mapping between the one or more SCCE and the corresponding SREG.

35. The base station of embodiment 34 wherein determining the mapping between the one or more SCCE and the corresponding SREG comprises determining the mapping between the one or more SCCE and the corresponding SREG based on a demodulation scheme used for the communication from the base station.

36. The base station of embodiment 35 wherein determining the mapping between the one or more SCCE and the corresponding SREG comprises the base station further configured to:

determine that the demodulation scheme used for the communication from the base station is CRS; and in response, determine the mapping between the one or more SCCE and the corresponding SREG to achieve high frequency diversity.

37. The base station of embodiment 36 wherein determining the mapping between the one or more SCCE and the corresponding SREG to achieve high frequency diversity comprises determining the SREG corresponding to an SCCE as selected in a distributed manner along the SPDCCH RB set as well as only from 1 OFDM symbol.

38. The base station of embodiment 36 wherein determining the mapping between the one or more SCCE and the corresponding SREG to achieve high frequency diversity comprises the base station further configured to:

for the distributed SCCE to SREG, map in 1os CRS-based SPDCCH, the SREGs corresponding to an SCCE index k are given by the following definition:

$$k + i * \left\lfloor \frac{N_{sREG_{tot}}}{N_{sREG/sCCE}} \right\rfloor$$

where k=0, ..., $N_{sCCE}$−1, $N_{sCCE}$ is the number of SCCE in the SPDCCH RB set, i=0, ..., $N_{sREG/sCCE}$−1, $N_{sREG_{tot}}$ is the total number of SREGs in the SPDCCH RB set, and $N_{sREG/sCCE}$ is the number of SREG per SCCE.

39. The base station of embodiment 36 wherein determining the mapping between the one or more SCCE and the corresponding SREG to achieve high frequency diversity comprises the base station further configured to:

for the SREG based distributed mapping in 2os CRS-based SPDCCH, the SREGs corresponding to an SCCE index k are given by the following definition:

$$k \bmod N_{sCCE/OS} + \left\lfloor \frac{k}{N_{sCCE/OS}} \right\rfloor * N_{sREG/OS} + i * N_{sCCE/OS}$$

where k=0, ..., $N_{sCCE}$−1, $N_{sCCE}$ is the number of SCCE in the SPDCCH RB set, i=0, ..., $N_{sREG/sCCE}$−1, $N_{sCCE/OS}$ is the number of SCCEs per OFDM symbol within the SPDCCH RB set, i.e. $N_{sCCE/OS} = \left\lfloor \frac{N_{sREG/OS}}{N_{sREG/sCCE}} \right\rfloor$.

$N_{sREG/OS}$ is the number of SREGs per OFDM symbol and $N_{sREG/sCCE}$ is the number of SREG per SCCE, i.e. 4 SREG/SCCE for CRS-based SPDCCH.

40. The base station of embodiment 36 wherein determining the mapping between the one or more SCCE and the corresponding SREG to achieve high frequency diversity comprises the base station further configured to:

for the SREG based localized mapping within 1os and 2os CRS-based SPDCCH, the SREGs corresponding to an SCCE index k are given by the following definition:

$$k * N_{sREG/sCCE} + i$$

where k=0, ..., $N_{sCCE}$−1, $N_{sCCE}$ is the number of SCCE in the SPDCCH RB set, i=0, ..., $N_{sREG/sCCE}$−1, and $N_{sREG/sCCE}$ is the number of SREG per SCCE, i.e. 4 SREG/SCCE for CRS-based SPDCCH.

41. The base station of embodiment 35 wherein determining the mapping between the one or more SCCE and the corresponding SREG comprises the base station further configured to:

determine that the demodulation scheme used for the communication from the base station is DMRS; and in response, determine the mapping between the one or more SCCE and the corresponding SREG based on that fact.

42. The base station of embodiment 41 wherein determining the mapping between the one or more SCCE and the corresponding SREG comprises the base station further configured to:

for the SCCE to SREG mapping in 2os and 3os DMRS-based SPDCCH, the SREGs corresponding to an SCCE index k are given by the following definition:

$$k * N_{sREG/sCCE} + i$$

where k=0, ..., $N_{sCCE}$−1, $N_{sCCE}$ is the number of SCCE in the SPDCCH RB set, i=0, ..., $N_{sREG/sCCE}$−1 and $N_{sREG/sCCE}$ is the number of SREG per SCCE, i.e. 4 SREG/SCCE for 2os DMRS-based SPDCCH and 6 SREG/SCCE for 3os DMRS-based SPDCCH.

43. The base station of any of the previous embodiments further comprising the base station further configured to:

for an aggregation level higher than one, the SCCEs corresponding to a distributed DMRS-based SPDCCH candidate m within the UE's SPDCCH RB set is defined as follows:

$$Y_{p,k}^L + m + i * \frac{N_{sCCE}}{L}$$

where $Y_{p,k}^L$ is a UE's SCCE starting offset configured by higher layer signaling, i=0, ..., L−1. L is the aggregation level and is higher than one, $N_{sCCE}$ is the total number of SCCEs in the SPDCCH RB set, and m=0, ..., $M^L$−1. $M^L$ is the number of SPDCCH candidates per aggregation level L.

44. The base station of any of the previous embodiments wherein receiving the communication from the base station comprises receiving the communication from the base station on a short Physical Downlink Control Channel (SPDCCH).

45. A communication system including a host computer comprising:

processing circuitry configured to provide user data; and
a communication interface configured to forward the user data to a cellular network for transmission to a User Equipment (UE), wherein the cellular network comprises a base station having a radio interface and processing circuitry, the base station's processing circuitry configured to:

determine a mapping between one or more short Control Channel Elements (SCCE) and corresponding short Resource Element Groups (SREG) for a communication to a User Equipment (UE); and transmit a communication to the UE based on the mapping between the one or more SCCE and the corresponding SREG.

46. The communication system of embodiment 45, further including the base station.

47. The communication system of embodiment 46, further including the UE, wherein the UE is configured to communicate with the base station.

48. The communication system of embodiment 47, wherein:
the processing circuitry of the host computer is configured to execute a host application, thereby providing the user data; and the UE comprises processing circuitry configured to execute a client application associated with the host application.

49. A method implemented in a communication system including a host computer, a base station and a User Equipment (UE), the method comprising:

at the host computer, providing user data; and
at the host computer, initiating a transmission carrying the user data to the UE via a cellular network comprising the base station, wherein the base station:

receives a communication from a base station;
determines a mapping between one or more short Control Channel Elements (SCCE) and corresponding short Resource Element Groups (SREG) for the communication from the base station; and processes the communication from the base station based on the mapping between one or more SCCE and corresponding SREG for the communication from the base station.

50. The method of embodiment 49, further comprising:
at the base station, transmitting the user data.

51. The method of embodiment 50, wherein the user data is provided at the host computer by executing a host application, the method further comprising:
at the UE, executing a client application associated with the host application.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
AL Aggregation Level
BLER Block Error Rate
CCE Control Channel Element
CRS Cell Specific Reference Signal
DCI Downlink Control Information
DL Downlink
DMRS Demodulation Reference Signal
EPDCCH Enhanced Physical Downlink Control Channel
E-UTRAN Evolved Universal Terrestrial Radio Access Network
eNB Enhanced or Evolved Node B
gNB New Radio Base Station
LTE Long Term Evolution
ms millisecond
NB Node B
NR New Radio
OFDM Orthogonal Frequency Division Multiplexing
RAN Radio Access Node
RB Resource Block
RBG Resource Block Group
RNTI Radio Network Temporary Identifier
RRC Radio Resource Control
SCCE short Control Channel Element
SC-FDMA Single Carrier Frequency Division Multiple Access
SF Subframe
SPDCCH short Physical Downlink Control Channel
SPDSCH short Physical Downlink Shared Channel
SREG short Resource Element Group
STTI Short Transmit Time Interval
TTI Transmit Time Interval
UE User Equipment
UL Uplink Those skilled in the art will recognize improvements and modifications to the embodiments of the present disclosure. All such improvements and modifications are considered within the scope of the concepts disclosed herein.

What is claimed is:

1. A method implemented in a User Equipment, UE, comprising:
receiving a communication from a base station;
determining a mapping between one or more Short Control Channel Elements, SCCEs, and corresponding Short Resource Element Groups, SREGs, for the communication from the base station; and processing the communication from the base station based on the mapping between the one or more SCCE and the corresponding SREG for the communication from the base station;
wherein determining the mapping between the one or more SCCE and the corresponding SREG comprises one of the group consisting of:
(1) for SREG based localized mapping within a 1os and 2os Cell Specific Reference Signal, CRS-based Short Physical Downlink Control Channel, SPDCCH, the SREGs corresponding to an SCCE index k are given by the following definition $$k * N_{\frac{sREG}{sCCE}} + i;$$

where $k=0, \ldots, N_{sCCE}-1$ $N_{sCCE}$ is the number of SCCEs in an SPDCCH Resource Block, RB, set, $i=0, \ldots, N_{sREG/sCCE}-1$, and $N_{sREG/sCCE}$ is the number of SREGs per SCCE; and (2) for SREG based distributed mapping in a 2os CRS-based Short Physical Downlink Control Channel, SPDCCH, the SREGs corresponding to an SCCE index k are given by the following definition:

$$k \bmod N_{sCCE/OS} + \left\lfloor \frac{k}{N_{sCCE/OS}} \right\rfloor * N_{\frac{sREG}{OS}} + i * N_{sCCE/OS};$$

where $k=0, \ldots, N_{sCCE}-1$ $N_{sCCE}$ is the number of SCCEs in the SPDCCH RB set, $i=0, \ldots, N_{sREG/sCCE}-1$, $N_{sCCE/OS}$ is the number of SCCEs per Orthogonal Frequency Division Multiplexing, OFDM, symbol within the SPDCCH RB set;

$$N_{sCCE/OS} = \left\lfloor \frac{N_{sREG/OS}}{N_{sREG/sCCE}} \right\rfloor;$$

$N_{sREG/OS}$ is the number of SREGs per OFDM symbol and $N_{sREG/sCCE}$ is the number of SREGs per SCCE.

2. The method of claim 1 wherein determining the mapping between the one or more SCCE and the corresponding SREG comprises:
determining the mapping between the one or more SCCE and the corresponding SREG based on a demodulation scheme used for the communication from the base station.

3. The method of claim 2 wherein determining the mapping between the one or more SCCE and the corresponding SREG comprises:
determining that the demodulation scheme used for the communication from the base station is a CRS; and
in response, determining the mapping between the one or more SCCE and the corresponding SREG to achieve high frequency diversity.

4. The method of claim 3 wherein determining the mapping between the one or more SCCE and the corresponding SREG to achieve the high frequency diversity comprises determining the SREG corresponding to the SCCE as selected in a distributed manner along a RB set as well as only from 1 OFDM symbol.

5. The method of claim 4 wherein determining the mapping between the one or more SCCE and the corresponding SREG to achieve the high frequency diversity comprises:
for the distributed SCCE to SREG mapping in a 1os CRS-based SPDCCH the SREGs corresponding to an SCCE index k are given by the following definition:

$$k + i * \left\lfloor \frac{N_{sREG_{tot}}}{N_{sREG/sCCE}} \right\rfloor$$

where k=0, ..., $N_{sCCE}$−1, $N_{sccE}$ is the number of SCCEs in an SPDCCH Resource Block, RB, set, i=0, ..., $N_{sREG/sCCE}$−1, $N_{sREGtot}$ is the total number of SREGs in the SPDCCH RB set, and $N_{sREG/sCCE}$ is the number of SREGs per SCCE.

6. The method of claim 4 wherein determining the mapping between the one or more SCCEs and the corresponding SREGs to achieve the high frequency diversity comprises:
for the SREG based distributed mapping in a 2os CRS-based SPDCCH the SREGs corresponding to an SCCE index k are given by the following definition:

$$k \bmod N_{sCCE/OS} + \left\lfloor \frac{k}{N_{sCCE/OS}} \right\rfloor * N_{\frac{sREG}{OS}} + i * N_{sCCE/OS}$$

where k=0, ..., $N_{sCCE}$−1, $N_{sCCE}$ is the number of SCCEs in the SPDCCH RB set, i=0, ..., $N_{sREG/sCCE}$−1, $N_{sCCE/OS}$ is the number of SCCEs per OFDM symbol within the SPDCCH RB set;

$$N_{sCCE/OS} = \left\lfloor \frac{N_{sREG/OS}}{N_{sREG/sCCE}} \right\rfloor;$$

$N_{sREG/OS}$ is the number of SREGs per OFDM symbol and $N_{sREG/sCCE}$ is the number of SREGs per SCCE.

7. The method of claim 3 wherein $N_{sREG/sCCE}$ is 4 for a CRS-based SPDCCH where $N_{sREG/sCCE}$ is the number of SREGs per SCCE.

8. The method of claim 3 wherein determining the mapping between the one or more SCCE and the corresponding SREG to achieve the high frequency diversity comprises:
for the SREG based localized mapping within a 1os and 2os CRS-based SPDCCH the SREGs corresponding to an SCCE index k are given by the following definition:

$$k * N_{sREG/sCCE} + i$$

where k=0, ..., $N_{sCCE}$−1, $N_{sCCE}$ is the number of SCCEs in the SPDCCH RB set, i=0, ..., $N_{sREG/sCCE}$−1, and $N_{sREG/sCCE}$ is the number of SREGs per SCCE.

9. The method of claim 8 wherein $N_{sREG/sCCE}$ is 4 for a CRS-based SPDCCH.

10. The method of claim 2 wherein determining the mapping between the one or more SCCE and the corresponding SREG comprises:
determining that a demodulation scheme used for the communication from the base station is a Demodulation Reference Signal, DMRS; and
in response, determining the mapping between the one or more SCCE and the corresponding SREG based on that fact.

11. The method of claim 10 wherein determining the mapping between the one or more SCCE and the corresponding SREG comprises:
for the SCCE to SREG mapping in 2os and 3os DMRS-based SPDCCHs the SREGs corresponding to an SCCE index k are given by the following definition:

$$k * N_{sREG/sCCE} + i$$

where k=0, ..., $N_{sCCE}$−1, $N_{sCCE}$ is the number of SCCE in the SPDCCH Resource Block, RB, set, i=0, ..., $N_{sREG/sCCE}$−1 and $N_{sREG/sCCE}$ is the number of SREGs per SCCE.

12. The method of claim 11 wherein $N_{sREG/sCCE}$ is 4 for the 2os DMRS-based SPDCCH.

13. The method of claim 11 wherein $N_{sREG/sCCE}$ is 6 for the 3os DMRS-based SPDCCH.

14. The method of claim 1 further comprising:
for an aggregation level higher than one, the SCCEs corresponding to a distributed DMRS-based SPDCCH candidate m within the SPDCCH RB set of the UE is defined as follows:

$$Y_{p,k}^L + m + i * \frac{N_{sCCE}}{L}$$

where $Y_p{}^L{}_k$ is an SCCE starting offset of the UE configured by higher layer signaling, i=0, ..., L−1; L is the aggregation level and is higher than one; $N_{sCCE}$ is the total number of SCCEs in the SPDCCH RB set; m=0, ..., $M^L$−1; and $M^L$ is the number of SPDCCH candidates per aggregation level L.

15. The method of claim 1 wherein receiving the communication from the base station comprises receiving the communication from the base station on an SPDCCH.

16. A User Equipment, UE, configured to communicate with a base station, the UE comprising a radio interface and processing circuitry configured to:
receive a communication from the base station;
determine a mapping between one or more Short Control Channel Elements, SCCEs, and corresponding Short Resource Element Groups, SREGs, for the communication from the base station; and
process the communication from the base station based on the mapping between the one or more SCCE and corresponding SREG for the communication from the base station;
wherein determining the mapping between the one or more SCCE and the corresponding SREG comprises one of the group consisting of:
(1) for SREG based localized mapping within a 1os and 2os Cell Specific Reference Signal, CRS-based Short Physical Downlink Control Channel, SPDCCH, the SREGs corresponding to an SCCE index k are given by the following $$k * N_{\frac{sREG}{sCCE}} + i;$$

where k=0, ..., $N_{sCCE}$−1 $N_{sCCE}$ is the number of SCCEs in an SPDCCH Resource Block, RB, set, i=0, ..., $N_{sREG/sCCE}$−1, and $N_{sREG/sCCE}$ is the number of SREGs per SCCE; and
(2) for SREG based distributed mapping in a 2os CRS-based Short Physical Downlink Control Channel, SPDCCH, the SREGs corresponding to an SCCE index k are given by the following definition:

$$k \bmod N_{sCCE/OS} + \left\lfloor \frac{k}{N_{sCCE/OS}} \right\rfloor * N_{\frac{sREG}{OS}} + i * N_{sCCE/OS};$$

where k=0, . . . , $N_{sCCE}-1$, $N_{sCCE}$ is the number of SCCEs in the SPDCCH RB set, i=0, . . . , $N_{sREG/sCCE}-1$, $N_{sccE/os}$ is the number of SCCEs per Orthogonal Frequency Division Multiplexing, OFDM, symbol within the SPDCCH RB set;

$$N_{sCCE/OS} = \left\lfloor \frac{N_{sREG/OS}}{N_{sREG/sCCE}} \right\rfloor;$$

$N_{sREG/os}$ is the number of SREGs per OFDM symbol and $N_{sREG/sccE}$ is the number of SREGs per SCCE.

17. The UE of claim 16 wherein determining the mapping between the one or more SCCE and the corresponding SREG comprises determining the mapping between the one or more SCCE and the corresponding SREG based on a demodulation scheme used for the communication from the base station.

18. The UE of claim 17 wherein determining the mapping between the one or more SCCE and the corresponding SREG comprises the UE further configured to:
determine that the demodulation scheme used for the communication from the base station is a CRS; and
in response, determine the mapping between the one or more SCCE and the corresponding SREG to achieve high frequency diversity.

19. A method implemented in a base station, comprising:
determining a mapping between one or more short Control Channel Elements, SCCEs, and corresponding short Resource Element Groups, SREGs, for a communication to a User Equipment, UE; and
transmitting the communication to the UE based on the mapping between the one or more SCCE and the corresponding SREG;
wherein determining the mapping between the one or more SCCE and the corresponding SREG comprises one of the group consisting of:
(1) for SREG based localized mapping within a 1os and 2os Cell Specific Reference Signal, CRS-based Short Physical Downlink Control Channel, SPDCCH, the SREGs corresponding to an SCCE index k are given by the following definition:

$$k * N_{\frac{sREG}{sCCE}} + i;$$

where k=0, . . . , $N_{sCCE}-1$ $N_{sCCE}$ is the number of SCCEs in an SPDCCH Resource Block, RB, set, i=0, . . . ,$N_{sREG/sCCE}-1$, and $N_{sREG/sCCE}$ is the number of SREGs per SCCE; and
(2) for SREG based distributed mapping in a 2os CRS-based Short Physical Downlink Control Channel, SPDCCH, the SREGs corresponding to an SCCE index k are given by the following definition:

$$k \bmod N_{sCCE/OS} + \left\lfloor \frac{k}{N_{sCCE/OS}} \right\rfloor * N_{\frac{sREG}{OS}} + i * N_{sCCE/OS};$$

where k=0, . . . , $N_{sCCE}-1$ $N_{sCCE}$ is the number of SCCEs in the SPDCCH RB set, i=0, . . . , $N_{sREG/sCCE}-1$, $N_{sCCE/OS}$ is the number of SCCEs per Orthogonal Frequency Division Multiplexing, OFDM, symbol within the SPDCCH RB set;

$$N_{sCCE/OS} = \left\lfloor \frac{N_{sREG/OS}}{N_{sREG/sCCE}} \right\rfloor;$$

$N_{sReg/OS}$ is the number of SREGs per OFDM symbol and $N_{sREG/sCCE}$ is the number of SREGs per SCCE.

20. A base station configured to communicate with a User Equipment, UE, the base station comprising a radio interface and processing circuitry configured to:
determine a mapping between one or more short Control Channel Elements, SCCEs, and corresponding short Resource Element Groups, SREGs, for a communication to the UE; and
transmit the communication to the UE based on the mapping between the one or more SCCE and the corresponding SREG;
wherein determining the mapping between the one or more SCCE and the corresponding SREG comprises one of the group consisting of:
(1) for SREG based localized mapping within a 1os and 2os Cell Specific Reference Signal, CRS-based Short Physical Downlink Control Channel, SPDCCH, the SREGs corresponding to an SCCE index k are given by the following:

$$k * N_{\frac{sREG}{sCCE}} + i;$$

where k=0, . . . , $N_{sCCE}-1$, $N_{sCCE}$ is the number of SCCEs in an SPDCCH Resource Block, RB, set, i=0, . . . , $N_{sREG/sCCE}-1$, and $N_{sREG/sCCE}$ is the number of SREGs per SCCE; and
(2) for SREG based distributed mapping in a 2os CRS-based Short Physical Downlink Control Channel, SPDCCH, the SREGs corresponding to an SCCE index k are given by the following definition:

$$k \bmod N_{sCCE/OS} + \left\lfloor \frac{k}{N_{sCCE/OS}} \right\rfloor * N_{\frac{sREG}{OS}} + i * N_{sCCE/OS};$$

where k=0, . . . , $N_{sCCE}-1$ is the number of SCCEs in the SPDCCH RB set, i=0, . . . ,$N_{sREG/sCCE}-1$, $N_{sREG/sCCE}$ is the number of SCCEs per Orthogonal Frequency Division Multiplexing, OFDM, symbol within the SPDCCH RB set;

$$N_{sCCE/OS} = \left\lfloor \frac{N_{sREG/OS}}{N_{sREG/sCCE}} \right\rfloor;$$

$N_{sREG/OS}$ is the number of SREGs per OFDM symbol and $N_{sREG/sCCE}$ is the number of SREGs per SCCE.

* * * * *